United States Patent
Pfeffer et al.

(10) Patent No.: US 10,667,019 B2
(45) Date of Patent: *May 26, 2020

(54) APPARATUS AND METHODS FOR MANAGING DELIVERY OF CONTENT IN A NETWORK WITH LIMITED BANDWIDTH USING PRE-CACHING

(71) Applicant: Time Warner Cable Enterprises LLC, St. Louis, MO (US)

(72) Inventors: Howard Pfeffer, Reston, VA (US); Daniel Stoller, Bedford, NY (US); Chris Stengrim, Wilton, CT (US)

(73) Assignee: TIME WARNER CABLE ENTERPRISES LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/236,115

(22) Filed: Dec. 28, 2018

(65) Prior Publication Data

US 2019/0200093 A1  Jun. 27, 2019

Related U.S. Application Data

(60) Continuation of application No. 14/642,493, filed on Mar. 9, 2015, now Pat. No. 10,171,885, which is a
(Continued)

(51) Int. Cl.
  *H04N 7/173* (2011.01)
  *H04N 21/647* (2011.01)
  (Continued)

(52) U.S. Cl.
  CPC ... *H04N 21/64738* (2013.01); *H04L 65/4092* (2013.01); *H04L 67/2842* (2013.01);
  (Continued)

(58) Field of Classification Search
  CPC ............ H04N 21/24; H04N 21/25891; H04N 21/26241; H04N 21/26258;
  (Continued)

(56) References Cited

U.S. PATENT DOCUMENTS 5,410,344 A  4/1995  Graves et al.
5,758,257 A  5/1998  Herz et al.
(Continued)

FOREIGN PATENT DOCUMENTS

WO  WO-0027044 A2  5/2000
WO  WO-0064174 A1  10/2000
(Continued)

OTHER PUBLICATIONS

MPEG Headers Quick Reference, http://dvd.sourceforge.net/dvdinfo/mpeghdrs.html, Mar. 6 2006.

*Primary Examiner* — Mulugeta Mengesha
(74) *Attorney, Agent, or Firm* — Gazdzinski & Associates, PC

(57) ABSTRACT

Apparatus and methods for managing provision of content to devices in a content delivery network. In one exemplary embodiment, content with a high probability of viewership is sent to consumer premises equipment (CPE) during off-peak periods and stored prior to viewing. An application is utilized to manage decisions related to content provision. The computer program will identify content that is likely to be of interest users associated with respective CPE, and schedule provision of that content in advance of viewing. Then, the system will develop a plan for optimal scheduling of transmission of content to CPEs, often including the use of trickle downloads. The scheduling plan is based collected statistical and historical data on network resource demand to make scheduling decisions. The system allows for the shifting of bandwidth utilization from periods of high demand to
(Continued)

those of low demand, and increased performance with regard to user experienced latency.

21 Claims, 11 Drawing Sheets

Related U.S. Application Data division of application No. 13/429,240, filed on Mar. 23, 2012, now Pat. No. 8,978,079.

(51) Int. Cl.
| | |
|---|---|
| H04L 29/06 | (2006.01) |
| H04L 29/08 | (2006.01) |
| H04N 21/258 | (2011.01) |
| H04N 21/262 | (2011.01) |
| H04N 21/472 | (2011.01) |
| H04N 21/6543 | (2011.01) |
| H04N 21/24 | (2011.01) |

(52) U.S. Cl.
CPC ....... *H04N 21/24* (2013.01); *H04N 21/25891* (2013.01); *H04N 21/26241* (2013.01); *H04N 21/26258* (2013.01); *H04N 21/47202* (2013.01); *H04N 21/6543* (2013.01); *H04L 65/4084* (2013.01)

(58) Field of Classification Search
CPC ....... H04N 21/47202; H04N 21/64738; H04N 21/6543; H04L 65/4092; H04L 67/2842
See application file for complete search history.

(56) References Cited

U.S. PATENT DOCUMENTS

| | | | |
|---|---|---|---|
| 5,844,552 A | 12/1998 | Gaughan et al. | |
| 6,088,722 A | 7/2000 | Herz et al. | |
| 6,118,472 A | 9/2000 | Dureau et al. | |
| 6,188,687 B1 | 2/2001 | Mussman et al. | |
| 6,317,885 B1 | 11/2001 | Fries | |
| 6,446,261 B1 | 9/2002 | Rosser | |
| 6,463,585 B1 | 10/2002 | Hendricks et al. | |
| 6,581,207 B1 | 6/2003 | Sumita et al. | |
| 6,687,735 B1 | 2/2004 | Logston et al. | |
| 7,020,893 B2 | 3/2006 | Connelly | |
| 7,167,895 B1 | 1/2007 | Connelly | |
| 7,171,687 B2 | 1/2007 | Uemura | |
| 7,197,472 B2 | 3/2007 | Conkwright et al. | |
| 7,197,708 B1 | 3/2007 | Frendo et al. | |
| 7,266,122 B1 | 9/2007 | Hogg et al. | |
| 7,284,064 B1 | 10/2007 | Connelly | |
| 7,292,602 B1 | 11/2007 | Liu et al. | |
| 7,324,552 B1 | 1/2008 | Galand et al. | |
| 7,327,679 B2 | 2/2008 | Naor et al. | |
| 7,330,893 B2 | 2/2008 | Qiu et al. | |
| 7,334,044 B1 | 2/2008 | Allen | |
| 7,336,967 B2 | 2/2008 | Kelly et al. | |
| 7,340,759 B1 | 3/2008 | Rodriguez | |
| 7,409,140 B2 | 8/2008 | Rodriguez et al. | |
| 7,457,520 B2 | 11/2008 | Rossetti et al. | |
| 7,500,235 B2 | 3/2009 | Maynard et al. | |
| 7,602,820 B2 | 10/2009 | Helms et al. | |
| 7,650,619 B2 | 1/2010 | Mineyama | |
| 7,787,539 B2 | 8/2010 | Chen | |
| 7,831,989 B1 | 11/2010 | Calzone et al. | |
| 7,843,856 B2 | 11/2010 | Ramakrishnan et al. | |
| 7,889,765 B2 | 2/2011 | Brooks et al. | |
| 7,895,445 B1 * | 2/2011 | Albanese | G06F 21/335 713/172 |
| 7,937,725 B1 | 5/2011 | Schaffer et al. | |
| 8,015,306 B2 | 9/2011 | Bowman | |
| 8,032,914 B2 | 10/2011 | Rodriguez | |
| 8,056,103 B2 | 11/2011 | Candelore | |
| 8,266,429 B2 | 9/2012 | Helms et al. | |
| 8,347,341 B2 | 1/2013 | Markley et al. | |
| 8,522,293 B2 | 8/2013 | Gonder et al. | |
| 8,582,584 B2 | 11/2013 | Rieger et al. | |
| 8,713,623 B2 | 4/2014 | Brooks | |
| 8,731,053 B2 | 5/2014 | Karegoudar | |
| 9,215,423 B2 | 12/2015 | Kimble et al. | |
| 9,270,944 B2 | 2/2016 | Brooks et al. | |
| 9,432,710 B2 | 8/2016 | Hill et al. | |
| 2001/0039656 A1 | 11/2001 | Nakamura et al. | |
| 2001/0050924 A1 | 12/2001 | Herrmann et al. | |
| 2002/0013948 A1 | 1/2002 | Aguayo et al. | |
| 2002/0026645 A1 | 2/2002 | Son et al. | |
| 2002/0032754 A1 | 3/2002 | Logston et al. | |
| 2002/0053076 A1 | 5/2002 | Landesmann | |
| 2002/0078444 A1 | 6/2002 | Krewin et al. | |
| 2002/0083451 A1 | 6/2002 | Gill et al. | |
| 2002/0087976 A1 | 7/2002 | Kaplan et al. | |
| 2002/0123928 A1 | 9/2002 | Eldering et al. | |
| 2002/0178446 A1 | 11/2002 | Sie et al. | |
| 2002/0188947 A1 | 12/2002 | Wang et al. | |
| 2003/0018973 A1 | 1/2003 | Thompson | |
| 2003/0043789 A1 | 3/2003 | Okajima et al. | |
| 2003/0056217 A1 | 3/2003 | Brooks | |
| 2003/0061618 A1 | 3/2003 | Horiuchi et al. | |
| 2003/0093790 A1 | 5/2003 | Logan et al. | |
| 2003/0126611 A1 | 7/2003 | Chernock et al. | |
| 2003/0135853 A1 | 7/2003 | Goldman et al. | |
| 2003/0135860 A1 | 7/2003 | Dureau | |
| 2003/0140351 A1 | 7/2003 | Hoarty et al. | |
| 2003/0142690 A1 | 7/2003 | Beser | |
| 2003/0145323 A1 | 7/2003 | Hendricks et al. | |
| 2003/0177488 A1 | 9/2003 | Smith et al. | |
| 2003/0217365 A1 | 11/2003 | Caputo | |
| 2003/0221191 A1 | 11/2003 | Khusheim | |
| 2004/0010588 A1 | 1/2004 | Slater et al. | |
| 2004/0019913 A1 | 1/2004 | Wong et al. | |
| 2004/0057457 A1 | 3/2004 | Ahn et al. | |
| 2004/0117838 A1 | 6/2004 | Karaoguz et al. | |
| 2004/0133701 A1 | 7/2004 | Karaoguz et al. | |
| 2004/0133907 A1 | 7/2004 | Rodriguez et al. | |
| 2004/0189879 A1 | 9/2004 | Read | |
| 2004/0210628 A1 | 10/2004 | Inkinen et al. | |
| 2004/0216158 A1 | 10/2004 | Blas | |
| 2004/0261094 A1 | 12/2004 | Huslak et al. | |
| 2004/0268403 A1 | 12/2004 | Krieger et al. | |
| 2005/0002418 A1 | 1/2005 | Yang et al. | |
| 2005/0034171 A1 | 2/2005 | Benya | |
| 2005/0047501 A1 | 3/2005 | Yoshida et al. | |
| 2005/0055685 A1 | 3/2005 | Maynard et al. | |
| 2005/0066355 A1 | 3/2005 | Cromer et al. | |
| 2005/0202827 A1 | 9/2005 | Demarco et al. | |
| 2005/0235307 A1 | 10/2005 | Relan et al. | |
| 2005/0240966 A1 | 10/2005 | Hindle et al. | |
| 2005/0289618 A1 | 12/2005 | Hardin | |
| 2006/0056437 A1 | 3/2006 | Fishwick | |
| 2006/0130107 A1 | 6/2006 | Gonder et al. | |
| 2006/0140206 A1 | 6/2006 | Kataria et al. | |
| 2006/0165173 A1 | 7/2006 | Kim et al. | |
| 2006/0171423 A1 | 8/2006 | Helms et al. | |
| 2007/0002897 A1 | 1/2007 | Goshen et al. | |
| 2007/0022459 A1 | 1/2007 | Gaebel, Jr. et al. | |
| 2007/0038671 A1 | 2/2007 | Holm et al. | |
| 2007/0076728 A1 | 4/2007 | Rieger et al. | |
| 2007/0104222 A1 | 5/2007 | Luss | |
| 2007/0116048 A1 | 5/2007 | Addington | |
| 2007/0118848 A1 | 5/2007 | Schwesinger et al. | |
| 2007/0121678 A1 | 5/2007 | Brooks et al. | |
| 2007/0136753 A1 | 6/2007 | Bovenschulte et al. | |
| 2007/0217436 A1 | 9/2007 | Markley et al. | |
| 2007/0298811 A1 | 12/2007 | Hartman et al. | |
| 2008/0025219 A1 | 1/2008 | Chao et al. | |
| 2008/0038251 A1 | 2/2008 | Pastorekova et al. | |
| 2008/0086750 A1 | 4/2008 | Yasrebi et al. | |
| 2008/0098212 A1 | 4/2008 | Helms et al. | |
| 2008/0134165 A1 | 6/2008 | Anderson et al. | |
| 2008/0137740 A1 | 6/2008 | Thoreau et al. | |
| 2008/0155614 A1 | 6/2008 | Cooper et al. | |
| 2008/0178225 A1 | 7/2008 | Jost | |

(56) References Cited

U.S. PATENT DOCUMENTS

| | | |
|---|---|---|
| 2008/0192820 A1 | 8/2008 | Brooks et al. |
| 2008/0235746 A1 | 9/2008 | Peters et al. |
| 2008/0273591 A1 | 11/2008 | Brooks et al. |
| 2009/0010426 A1* | 1/2009 | Redmond ......... H04L 29/06027 380/29 |
| 2009/0025027 A1 | 1/2009 | Craner |
| 2009/0028182 A1 | 1/2009 | Brooks et al. |
| 2009/0083279 A1 | 3/2009 | Hasek |
| 2009/0183081 A1 | 7/2009 | Rodriguez et al. |
| 2009/0187944 A1 | 7/2009 | White et al. |
| 2009/0193485 A1 | 7/2009 | Rieger et al. |
| 2009/0213871 A1 | 8/2009 | Carlson et al. |
| 2010/0023972 A1 | 1/2010 | Summers et al. |
| 2010/0083329 A1 | 4/2010 | Joyce et al. |
| 2010/0100915 A1 | 4/2010 | Krikorian et al. |
| 2010/0135646 A1 | 6/2010 | Bang et al. |
| 2010/0251305 A1 | 9/2010 | Kimble et al. |
| 2010/0312861 A1* | 12/2010 | Kolhi ..................... H04L 67/28 709/219 |
| 2010/0313225 A1 | 12/2010 | Cholas et al. |
| 2010/0325666 A1 | 12/2010 | Wiser et al. |
| 2011/0016479 A1 | 1/2011 | Tidwell et al. |
| 2011/0044227 A1 | 2/2011 | Harrang et al. |
| 2011/0090898 A1 | 4/2011 | Patel et al. |
| 2011/0093900 A1 | 4/2011 | Patel et al. |
| 2011/0296046 A1 | 12/2011 | Arya et al. |
| 2012/0131623 A1 | 5/2012 | McDysan et al. |
| 2013/0125175 A1 | 5/2013 | Hao et al. |
| 2013/0166690 A1* | 6/2013 | Shatzkamer ..... H04N 21/25891 709/219 |
| 2015/0020126 A1 | 1/2015 | Kegel et al. |

FOREIGN PATENT DOCUMENTS

| | | |
|---|---|---|
| WO | WO-0139505 A2 | 5/2001 |
| WO | WO-0219249 A2 | 3/2002 |
| WO | WO-02080547 A2 | 10/2002 |
| WO | WO-03103292 A1 | 12/2003 |
| WO | WO-2004075489 A1 | 9/2004 |

\* cited by examiner

APPARATUS AND METHODS FOR MANAGING DELIVERY OF CONTENT IN A NETWORK WITH LIMITED BANDWIDTH USING PRE-CACHING

PRIORITY AND RELATED APPLICATIONS

This application is a continuation of and claims the benefit of priority to co-owned U.S. patent application Ser. No. 14/642,493 of the same title filed Mar. 9, 2015, issuing as U.S. Pat. No. 10,171,885 on Jan. 1, 2019, which is a divisional of and claims the benefit of priority to co-owned U.S. patent application Ser. No. 13/429,240 of the same title filed Mar. 23, 2012, issued as U.S. Pat. No. 8,978,079 on Mar. 10, 2015, each of which is incorporated herein by reference in its entirety.

This application is related to commonly owned U.S. patent application Ser. No. 11/800,093 filed May 4, 2007 and entitled "METHODS AND APPARATUS FOR PREDICTIVE CAPACITY ALLOCATION", issued as U.S. Pat. No. 9,398,346 on Jul. 19, 2016, U.S. patent application Ser. No. 12/012,019 filed Jan. 30, 2008 and entitled "METHODS AND APPARATUS FOR PREDICTIVE DELIVERY OF CONTENT OVER A NETWORK", issued as U.S. Pat. No. 9,060,208 on Jun. 16, 2015, and U.S. patent application Ser. No. 12/582,619 filed Oct. 20, 2009 and entitled "GATEWAY APPARATUS AND METHODS FOR DIGITAL CONTENT DELIVERY IN A NETWORK", issued as U.S. Pat. No. 9,027,062 on May 5, 2015, each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The invention relates generally to the field of data and content delivery. In one exemplary aspect, the invention relates to the management of bandwidth utilization on a content delivery network.

2. Description of Related Technology

One significant competitive challenge presently faced by operators of content delivery networks relates to managing and conserving bandwidth. This includes the reclamation of otherwise under-utilized or unused bandwidth, such that the service or customer base can be expanded without significant modifications or build-outs of the underlying network infrastructure. For example, it is desirable to expand the types and availability of "next-generation" network services, including high-definition (HD) broadcast, VOD, high-speed data (HSD), VoIP, Interactive TV, IP-based services to mobile devices, etc. over time, without the need for major capital expenditures or system modifications. Hence, network operators are increasingly focused on techniques for "squeezing" as much capacity out of their existing networks as possible.

In a conventional content delivery network (such as e.g., a cable network), bandwidth planning and usage tends to be relatively static over time. A network operator periodically changes the channel line-up to delete channels, add new channels and services, or change the relationship between logical channel map and frequency domain location of the channels. Channel line-up changes are done typically a few times a year to meet the engineering and business needs, and resources available in the network. Thus, channels available in the network stay relatively static when compared to the frequency with which subscribers tune in and out of various program channels.

Typically, a tradeoff must be made between allocating bandwidth to programs currently carried on the network to meet or exceed their quality requirements, yet at the same time keeping sufficient bandwidth in reserve to be made available to new program requests, or sudden changes in available network bandwidth resources (e.g., equipment failure).

With the availability of new technologies such as high definition (HD) programming and streaming technologies to provide users with individualized content, network operators are facing a bandwidth "crunch" of sorts, and have started looking at delivery methods on their content networks to optimally utilized bandwidth. One such technology comprises a "switched" network architecture (commonly referred to as switched digital broadcast (SDB), or broadcast switched architecture (BSA)), described in greater detail subsequently herein. In such a network, individualized program delivery can be provided to each subscriber (or small groups of subscribers).

Moreover, network operators may face changes in demand that fluctuate according to the time of day, week, month or year. These cycles can result in significant periods of both over- and under-utilization of network resources. For example, during peak hours subscriber demand for content may reach or exceed the capacity of the network. Thus, undesirable situations may arise in which subscriber requests for programs or other services may be rejected because of capacity limits. Conversely, during off-peak hours network capacity is significantly underutilized. Thus, this network capacity, which often represents a significant capital investment by the service provider, is not contributing to revenue generation or customer experience enhancement.

Therefore, there is a need for new techniques that facilitate more constant network usage in lieu of systems that promote periods of high demand followed by periods of low demand. These new techniques should ideally both reduce demand during peak times and increase demand during off-peak periods. In addition, any such technique should ideally be capable of being integrated with existing network infrastructure.

SUMMARY OF THE INVENTION

The present invention provides, inter alia, apparatus and methods for managing delivery of content in a network with limited bandwidth.

In a first aspect of the invention, a method of operating a content delivery network is disclosed. In one embodiment, the method includes: identifying high probability of viewership (HpoV) content; and scheduling transmission of said HpoV content to said one or more CPE during an expected period of low network demand. The transmission comprises a transmission rate less than that associated with a real-time presentation of said HpoV content.

In another embodiment, the method includes: identifying high probability of viewership (HpoV) content; and scheduling transmission of said HpoV content to said one or more network users during one or more expected periods of low network demand, the transmission comprising transmission to a caching entity substantially proximate to one or more CPE of respective ones of said one or more users within a topology of said network.

In a second aspect of the invention, a method of delivering high probability of viewership (HpoV) content over a network having a topology is disclosed. In one embodiment, the method includes: transmitting said HpoV content to one or more network users during one or more expected periods of low network demand, said transmission comprising transmission to a caching entity disposed at or near an edge of said topology of said network; and selectively increasing a rate of said transmission at least in part in response to at least one of said users initiating a presentation of said HpoV content at a client device.

In a third aspect of the invention, an apparatus for the management and distribution of content in a content delivery network is disclosed. In one embodiment, the apparatus includes: at least one interface to communicate with a plurality of CPE operatively coupled to said network; one or more storage apparatus configured to store: a plurality of content for distribution to subsets of said plurality of CPE; one or more rules guiding the distribution of individual ones of said plurality content; and classification information related to said individual ones of said plurality said content; and a processing unit in data communication with the interface and the one or more storage apparatus. In one variant, the processing unit is configured to: based at least in part on said classification information, identify individual ones of said plurality of content that are HpoV content for a subset of said plurality of CPE; identify rules guiding the distribution of said HpoV content among said rules guiding the distribution of said individual ones of said plurality said content; and schedule transmission of one or more of (i) said HpoV content and (ii) said rules guiding presentation of said HpoV content to said subset of said plurality of CPE.

In a fourth aspect of the invention, a computer readable medium is disclosed. In one embodiment, the computer readable medium comprises a plurality of instructions which are configured to, when executed select and download via an efficient downstream mechanism select content that has a high probability of use by a subscriber of a network. In one variant, the network comprises a managed network such as a cable, satellite, optical fiber, or HFCu network. In another variant, the network comprises an unmanaged network such as the Internet.

In a fifth aspect of the invention, a user device configured for using cached content is disclosed. In one embodiment, the user device comprises a consumer premised device such as a set-top box, DVR, satellite receiver, etc. In another variant, the user device comprises a mobile wireless device with, e.g., a cellular and/or WLAN air interface.

In a fifth aspect of the invention, an edge/near-edge caching device is disclosed. In one embodiment, the device includes a mass storage device capable of storing pre-cached content for delivery to a user. In one variant, the device is disposed at the user's premises. In another variant, the device includes transcoding/transrating capability to adapt the cached content for use on various user premises or mobile device.

In a sixth aspect of the invention, a network architecture is disclosed. In one embodiment, the architecture includes a supervisory process and an edge/near-edge cache apparatus, the process being used to select content for particular users/CPE, and in communication with the edge cache for delivering the selected content in advance of the user requesting it, and via a non-bandwidth limiting mechanism.

In another aspect of the present disclosure, a non-transitory computer-readable apparatus is disclosed. In one embodiment, the non-transitory computer-readable apparatus includes a storage medium having at least one computer program stored thereon, the at least one computer program including a plurality of instructions configured to, when executed by a processor apparatus, cause a networked apparatus to: generate prediction data relating to a likelihood of interest by the user for the digitally rendered content; identify the digitally rendered content as, for example, high probability of viewership (HpoV) content; and cause transmission, during an expected period of low network demand, of at least a portion of the HpoV content to one or more computerized client devices associated with at least the user.

In another aspect of the present disclosure, a computer-implemented method of operating a content delivery network is disclosed. In one embodiment, the computer-implemented method includes: selecting, from a plurality of digitally rendered content elements, at least one predicted digitally rendered content element which the user is likely to be interested in consuming; and scheduling a transmission of the selected at least one digitally rendered content element to one or more client devices associated with the user during a period when network demand is expected to be below a prescribed value, the scheduled transmission of the predicted at least one digitally rendered content element comprising a transmission at a data rate less than that associated with a real-time presentation of digitally rendered content.

In another aspect of the present disclosure, an apparatus is disclosed. In one embodiment, the apparatus is operable within a content delivery network and includes: an interface configured to communicate with the content delivery network; a storage apparatus having at least one computer program, the at least one computer program including a plurality of computer-readable instructions; and a processor apparatus configured to execute the plurality of computer-readable instructions, the plurality of computer-readable instructions being configured to cause the apparatus to, when executed, cause the apparatus to: identify digital content, and access data related to the identified digital content; evaluate the data related to the identified digital content with respect to one or more criteria to determine whether at least a partial match exists between the identified digital content and behavioral data associated with a user; and based on a determination that at least the partial match exists between the identified digital content and the behavioral data, schedule transmission of the identified digital content via the network interface to one or more client devices associated with the user during a period where network demand is expected or predicted to fall below a prescribed threshold.

These and other aspects of the invention shall become apparent when considered in light of the disclosure provided herein.

Figure 1:
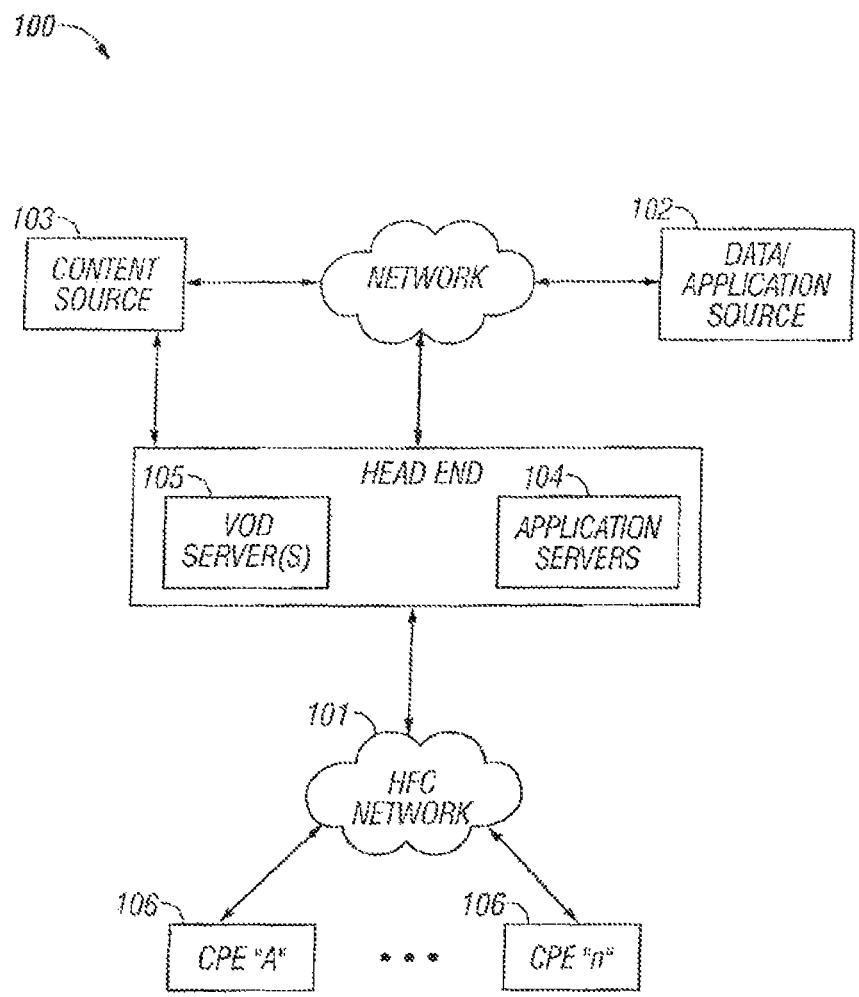
FIG. 1 is a functional block diagram illustrating an exemplary hybrid fiber/coax (HFC) cable network configuration useful with the present invention.

All Figures © Copyright 2011-2012 Time Warner Cable, Inc. All rights reserved.

DETAILED DESCRIPTION OF THE INVENTION

Reference is now made to the drawings wherein like numerals refer to like parts throughout.

As used herein, the term "application" refers generally to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the terms "client device" and "end user device" include, but are not limited to, set-top boxes (e.g., DSTBs), gateways, modems, personal computers (PCs), and minicomputers, whether desktop, laptop, or otherwise, and mobile devices such as handheld computers, PDAs, personal media devices (PMDs), tablets, and smartphones.

As used herein, the term "codec" refers to a video, audio, or other data coding and/or decoding algorithm, process or apparatus including, without limitation, those of the MPEG (e.g., MPEG-1, MPEG-2, MPEG-4/H.264, etc.), Real (Real-Video, etc.), AC-3 (audio), DiVX, XViD/ViDX, Windows Media Video (e.g., WMV 7, 8, 9, 10, or 11), ATI Video codec, or VC-1 (SMPTE standard 421M) families.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (e.g., BREW), and the like.

The terms "Consumer Premises Equipment (CPE)" and "host device" refer without limitation to any type of electronic equipment located within a consumer's or user's premises and connected to a network. The term "host device" includes terminal devices that have access to digital television content via a satellite, cable, or terrestrial network. The host device functionality may be integrated into a digital television (DTV) set. The term "consumer premises equipment" (CPE) includes such electronic equipment such as set-top boxes, televisions, Digital Video Recorders (DVR), gateway storage devices (Furnace), and ITV Personal Computers.

As used herein, the term "DOCSIS" refers to any of the existing or planned variants of the Data Over Cable Services Interface Specification, including for example DOCSIS versions 1.0, 1.1, 2.0 and 3.0.

As used herein, the term "headend" refers generally to a networked system controlled by an operator (e.g., an MSO or multiple systems operator) that distributes programming to MSO clientele using client devices. Such programming may include literally any information source/receiver including, inter alia, free-to-air TV channels, pay TV channels, interactive TV, and the Internet.

As used herein, the terms "Internet" and "internet" are used interchangeably to refer to inter-networks including, without limitation, the Internet.

As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer without limitation to a cable, fiber to the home (FTTH), fiber to the curb (FTTC), satellite, Hybrid Fiber Copper (HFCu), or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, HFCu networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols.

As used herein, the term "network interface" refers to any signal, data, or software interface with a component, network or process including, without limitation, those of the FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), WiMAX (802.16), PAN (e.g., 802.15), or IrDA families.

As used herein, the term "node" refers to any functional entity associated with a network, such as for example an OLT or ONU, whether physically discrete or distributed across multiple locations.

As used herein, the term "QAM" refers to modulation schemes used for sending signals over cable networks. Such modulation scheme might use any constellation level (e.g. QPSK, 16-QAM, 64-QAM, 256-QAM, etc.) depending on details of a cable network. A QAM may also refer to a physical channel modulated according to the schemes.

As used herein, the term "server" refers to any computerized component, system or entity regardless of form which is adapted to provide data, files, applications, content, or other services to one or more other devices or entities on a computer network.

As used herein, the term "service", "content", "program" and "stream" are sometimes used synonymously to refer to a sequence of packetized data that is provided in what a subscriber may perceive as a service. A "service" (or "content", or "stream") in the former, specialized sense may correspond to different types of services in the latter, non-technical sense. For example, a "service" in the specialized sense may correspond to, among others, video broadcast, audio-only broadcast, pay-per-view, or video-on-demand. The perceivable content provided on such a "service" may be live, pre-recorded, delimited in time, undelimited in time, or of other descriptions. In some cases, a "service" in the specialized sense may correspond to what a subscriber would perceive as a "channel" in traditional broadcast television.

As used herein, the term "service group" refers to either a group of service users (e.g. subscribers), or the resources shared by them in the form of for example entire cable RF signal, only the RF channels used to receive the service or otherwise treated as a single logical unit by the network for resource assignment.

As used herein, the term "wireless" means any wireless signal, data, communication, or other interface including without limitation Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PC S/DCS, LTE/LTE-A, analog cellular, CDPD, satellite systems, millimeter wave or microwave systems, acoustic, and infrared (i.e., IrDA).

Overview

In one salient aspect of the present invention, the provision of content (e.g., non-linear content such as on-demand content) is shifted to off-peak periods using a pre-caching technique. In one exemplary embodiment, content with a high probability of viewership (hereinafter "HpoV") is sent to specific CPE during off-peak periods, and stored prior to viewing. Because the content is stored locally at the CPE, the user associated with the CPE can experience low-latency viewing of the content without the performance degradation associated with transmission and processing. Moreover, this experience can be achieved using significantly less bandwidth than that which may be associated with normal delivery of the content. Thus, a low-bandwidth transmission (such as e.g., a "trickle" download) can be used.

In some embodiments, a supervisory process (e.g., computer program or application) is utilized to manage decisions related to content provision. The computer program identifies content that is likely to be of interest users associated with respective CPE, and schedule provision of that content in advance of viewing. The exemplary implementation of the application bases its decisions on classification information provided with the content. This information can include, inter alia, (i) the subject matter of the content, (ii) a list of other related content, and (iii) demographic or psychographic information associated with the content. The application then compares the classification information to data associated with one or more individual CPE. The information associated with the CPE can include, inter alia, (i) user requests, (ii) user history, (iii) user preferences or interests, and/or (iv) subscriber demographic or psychographic information.

The system may be used to deliver content provided through the MSO (multiple systems operator), or may be in the delivery of over-the-top (OTT) content. In some embodiments, a playlist, queue, or other request list from an OTT content provider (e.g. Netflix®, Hulu®, or HBO Go®) is used to identify HpoV content for pre-caching. In some variants, the MSO works in conjunction with the OTT provider to pre-cache the OTT content.

The system develops a plan for optimal scheduling of transmission of content to CPEs (including the use of trickle downloads during off-peak periods) based on the foregoing analysis. The scheduling plan uses collected statistical and historical data on network resource demand to make scheduling decisions. Thus, the system is able to effectively predict the periods in which scheduling the download to the user's CPE will have the least impact on network performance. Furthermore, should an unforeseeable spike in network demand arise, these "trickle" downloads can be interrupted and/or rescheduled, because they do not correspond to requests for live viewing of content.

In addition, the scheduling of the provision of content may account for the time that a particular download may take. This approach ensures that the trickle download completes prior to the user initiating a presentation of the content. The foregoing exemplary embodiments provide a number of different benefits and advantages, including inter alia: (i) shifting bandwidth utilization from periods of high demand to those of low demand, thereby significantly "flattening" the demand profile, (ii) increased performance with regard to user experience latency, and (iii) enhanced system performance through the expansion of storage rather than use of instantaneous bandwidth.

In some embodiments, measures to ensure proper controls of the pre-cached content, encryption and/or digital rights management tools may be used.

Further, the content may be provisioned in an incomplete or substantially incomplete form. For example, the pre-cached media may selectively omit portions (e.g., every other bit) of a particular digitally-encoded content element. In this case, even if other content protect schemes fail, the content is none-the-less rendered useless until the complementary (removed) bits are provided.

Embodiments pre-caching content at network edge devices ("edge caching") and at peer CPE devices (P2P) are also disclosed.

DETAILED DESCRIPTION OF EXEMPLARY EMBODIMENTS

Exemplary embodiments of the apparatus and methods of the present invention are now described in detail. While these exemplary embodiments are described in the context of the aforementioned hybrid fiber/coax (HFC) cable system architecture having an multiple systems operator (MSO), digital networking capability, IP delivery capability, and plurality of client devices/CPE, the general principles and advantages of the invention may be extended to other types of networks and architectures, whether broadband, narrowband, wired or wireless, or otherwise, the following therefore being merely exemplary in nature.

It will also be appreciated that while described generally in the context of a consumer (i.e., home) end user domain, the present invention may be readily adapted to other types of environments (e.g., commercial/enterprise, government/military, etc.) as well. Myriad other applications are possible.

It is further noted that while exemplary embodiments are described primarily in the context of a hybrid fiber/conductor (e.g., cable) system with legacy 6 MHz RF channels, the present invention is applicable to literally any network topology or paradigm, and any frequency/bandwidth. Furthermore, as referenced above, the invention is in no way limited to traditional cable system frequencies (i.e., below 1 GHz), and in fact may be used with systems that operate above 1 GHz band in center frequency or bandwidth, to include without limitation so-called ultra-wideband systems.

Other features and advantages of the present invention will immediately be recognized by persons of ordinary skill in the art with reference to the attached drawings and detailed description of exemplary embodiments as given below.

Network—

FIG. 1 illustrates a typical content delivery network configuration with which the apparatus and methods of the present invention may be used. The various components of the network 100 include (i) one or more data and application origination points 102; (ii) one or more content sources 103; (iii) one or more application distribution servers 104; (iv) one or more VOD servers 105, and (v) customer premises equipment (CPE) 106. The distribution server(s) 104, VOD servers 105 and CPE(s) 106 are connected via a bearer (e.g., HFC) network 101. A simple architecture comprising one of each of the aforementioned components 102, 104, 105, 106 is shown in FIG. 1 for simplicity, although it will be recognized that comparable architectures with multiple origination points, distribution servers, VOD servers, and/or CPE devices (as well as different network topologies) may be utilized consistent with the invention. For example, the headend architecture of FIG. 1a (described in greater detail below) may be used.

The data/application origination point 102 comprises any medium that allows data and/or applications (such as a VOD-based or "Watch TV" application) to be transferred to a distribution server 104. This can include for example a third party data source, application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The application distribution server 104 comprises a computer system where such applications can enter the network system. Distribution servers are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other locations, whether local or remote to the distribution server 104) that can be accessed by a distribution server 104.

Figure 1A:
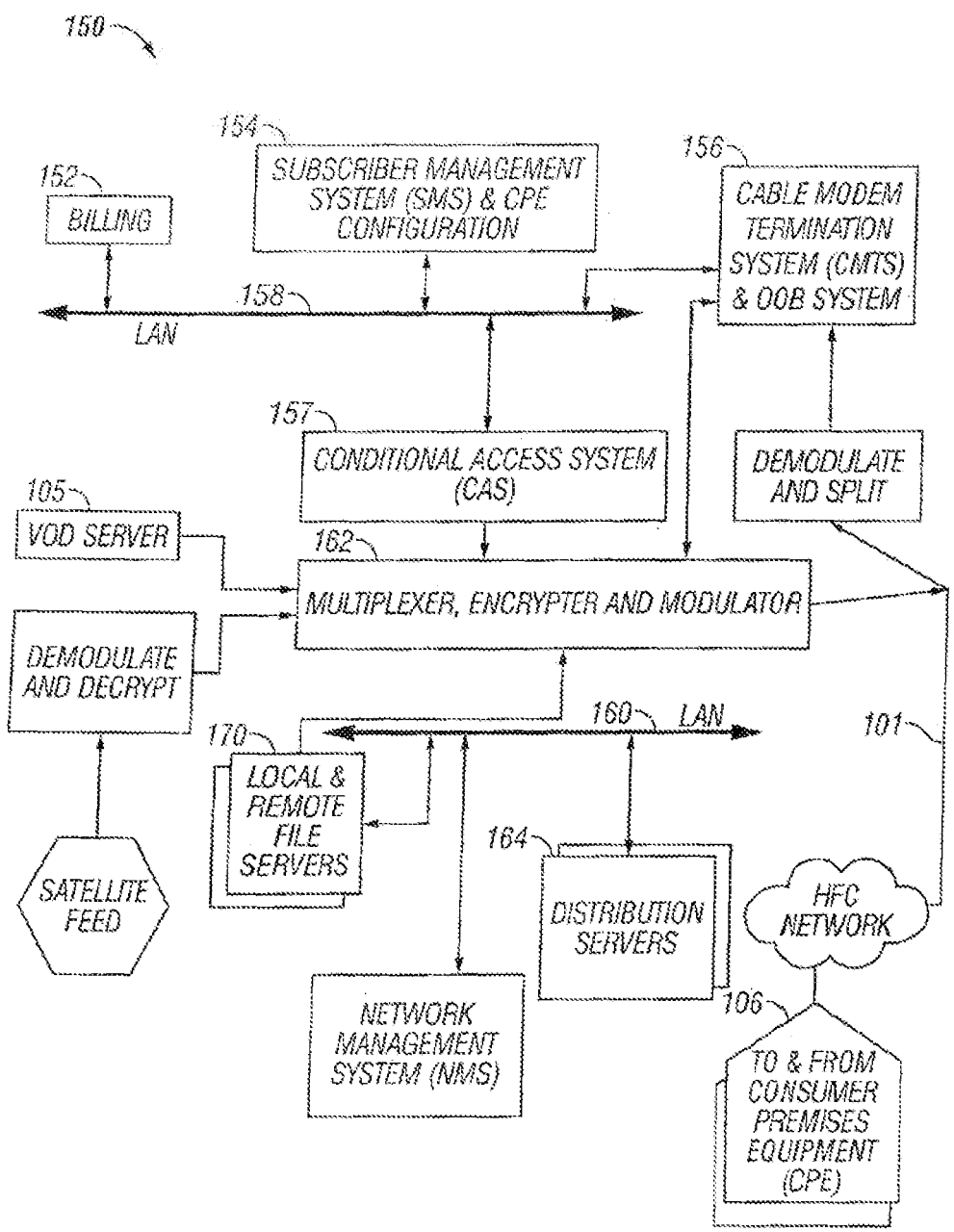
FIG. 1a is a functional block diagram illustrating one exemplary HFC cable network headend configuration useful with the present invention.

Referring now to FIG. 1a, one exemplary embodiment of a headend architecture useful with the present invention is described. As shown in FIG. 1a, the headend architecture 150 comprises typical headend components and services including billing module 152, subscriber management system (SMS) and CPE configuration management module 154, cable-modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the invention. It will also be appreciated that the headend configuration depicted in FIG. 1a is high-level, conceptual architecture and that each MSO may have multiple headends deployed using custom architectures.

Figure 1B:
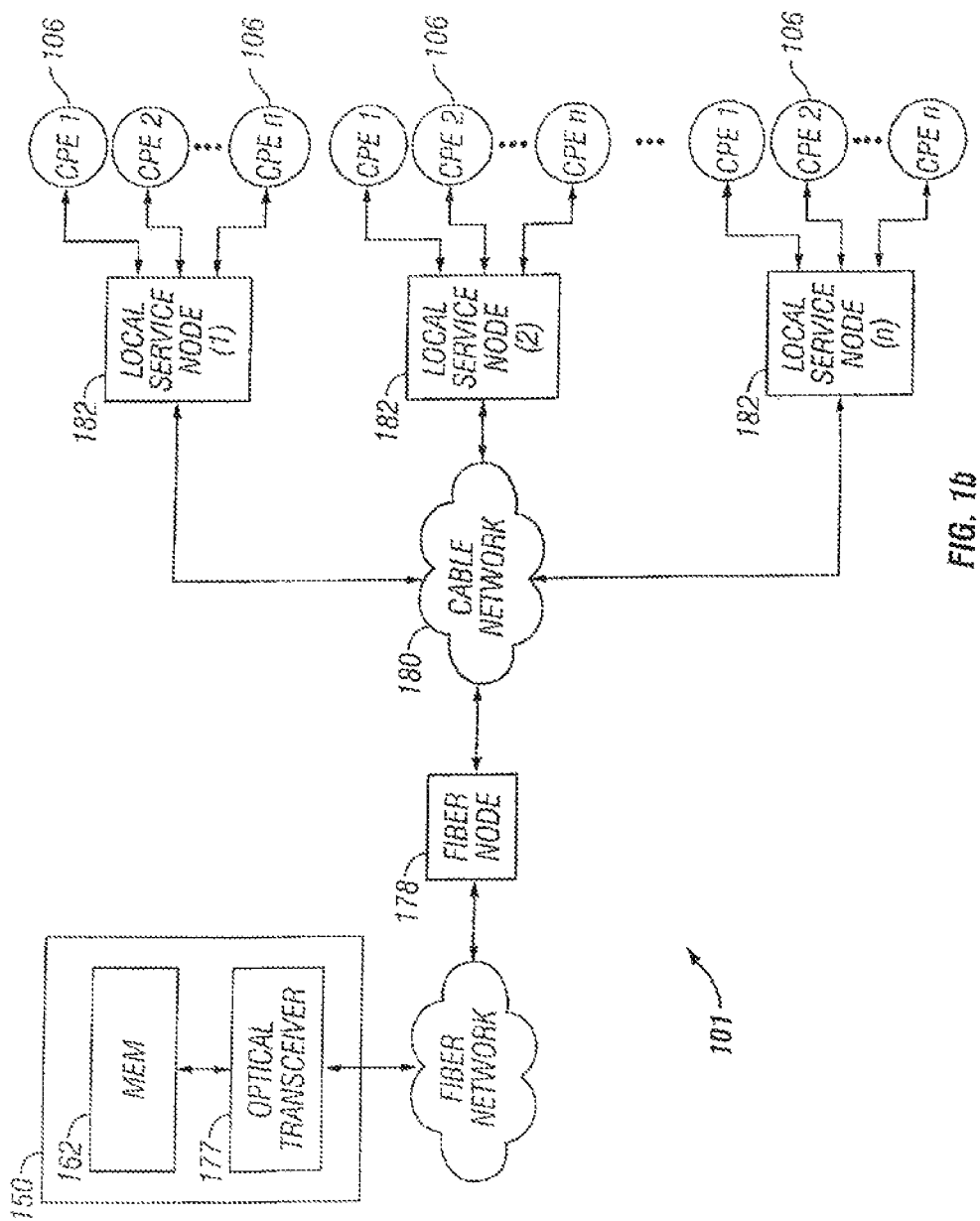
FIG. 1b is a functional block diagram illustrating one exemplary local service node configuration useful with the present invention.

The exemplary architecture 150 of FIG. 1a further includes a multiplexer-encrypter-modulator (MEM) 162 coupled to the HFC network 101 adapted to process or condition content for transmission over the network. The distribution servers 164 are coupled to the LAN 160, which provides access to the MEM 162 and network 101 via one or more file servers 170. The VoD servers 105 are coupled to the LAN 160 as well, although other architectures may be employed (such as for example where the VoD servers are associated with a core switching device such as an 802.3z Gigabit Ethernet device). As previously described, information is carried across multiple channels. Thus, the headend must be adapted to acquire the information for the carried channels from various sources. Typically, the channels being delivered from the headend 150 to the CPE 106 ("downstream") are multiplexed together in the headend as previously described, and sent to neighborhood hubs (FIG. 1b) via a variety of interposed network components.

Figure 1C:
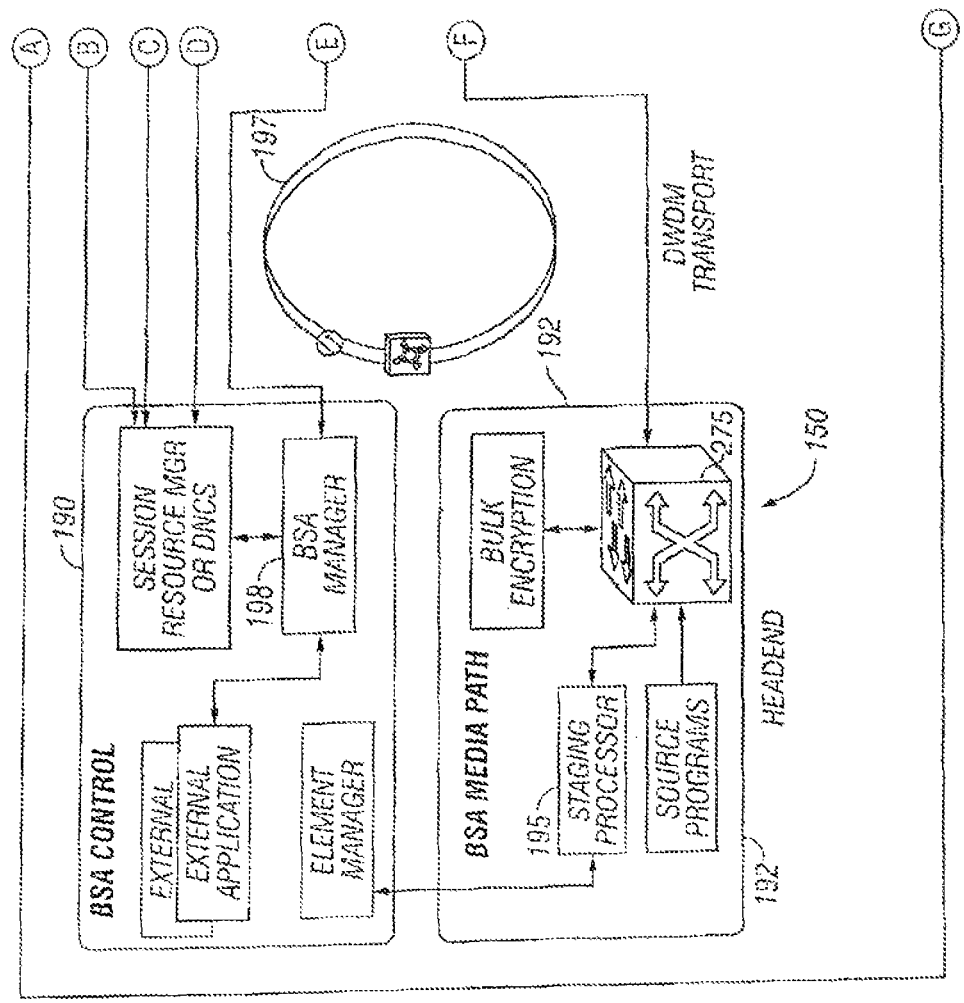
FIG. 1c is a functional block diagram illustrating one exemplary broadcast switched architecture (BSA) network useful with the present invention.
Figure 1C:
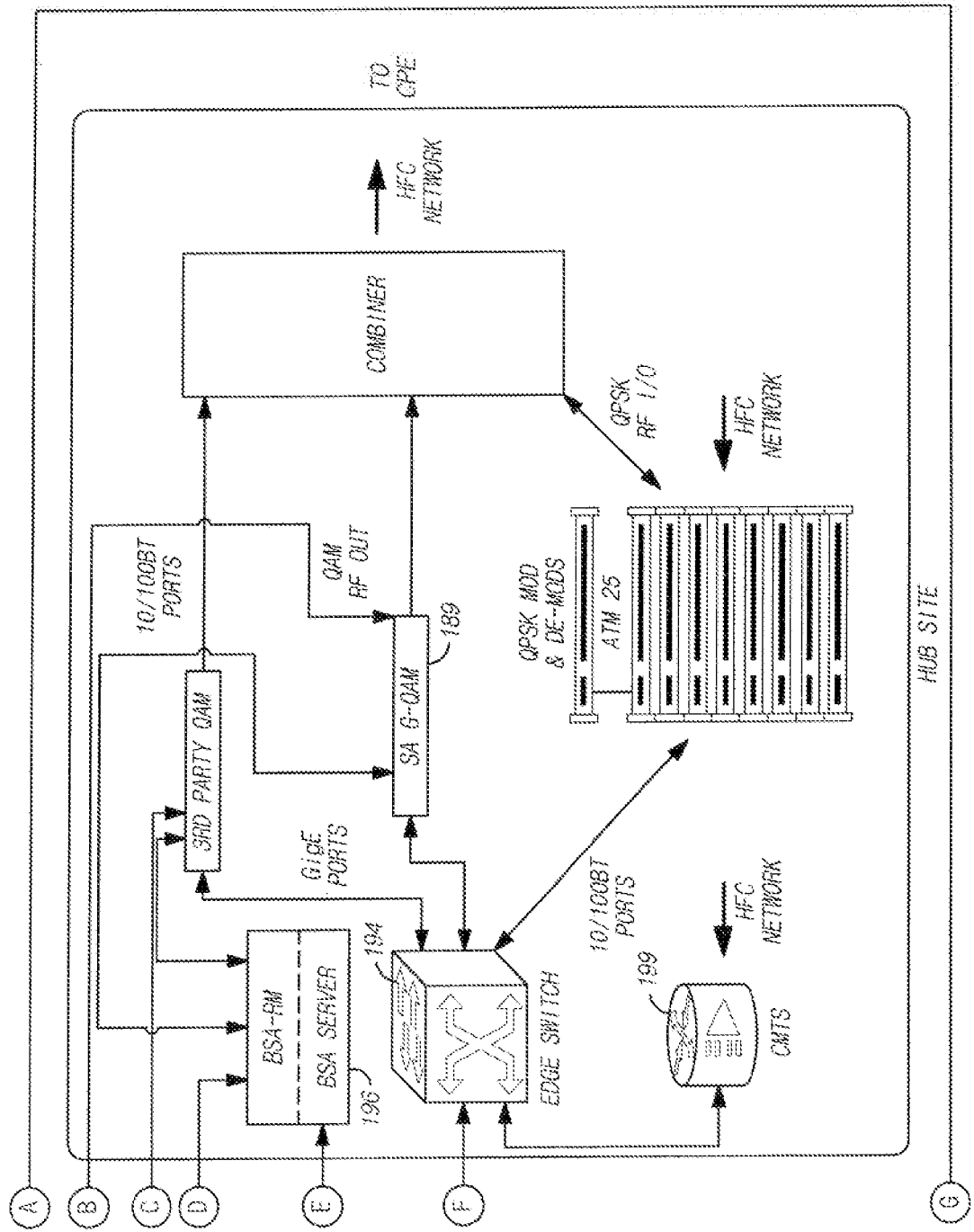

It will also be recognized, however, that the multiplexing operation(s) need not necessarily occur at the headend 150 (e.g., in the aforementioned MEM 162). For example, in one variant, at least a portion of the multiplexing is conducted at a BSA switching node or hub (see discussion of FIG. 1c provided subsequently herein). As yet another alternative, a multi-location or multi-stage approach can be used, such as that described in U.S. patent application Ser. No. 11/048,334, filed Feb. 1, 2005 and entitled "APPARATUS AND METHODS FOR MULTI-STAGE MULTIPLEXING IN A NETWORK", issued as U.S. Pat. No. 7,602,820 on Oct. 13, 2009, incorporated herein by reference in its entirety, which discloses inter alia improved multiplexing apparatus and methods that allow such systems to dynamically compensate for content (e.g., advertisements, promotions, or other programs) that is inserted at a downstream network node such as a local hub, as well as "feed back" and "feed forward" mechanisms for transferring information between multiplexing stages.

Content (e.g., audio, video, data, files, etc.) is provided in each downstream (in-band) channel associated with the relevant service group. To communicate with the headend or intermediary node (e.g., hub server), the CPE 106 may use the out-of-band (OOB) or DOCSIS channels and associated protocols. The OCAP 1.0, 2.0, 3.0 (and subsequent) specification provides for exemplary networking protocols both downstream and upstream, although the invention is in no way limited to these approaches.

It will also be recognized that the multiple servers (broadcast, VoD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

"Switched" Networks—

FIG. 1c illustrates an exemplary configuration of a "switched" network architecture (referenced above), which is also useful with the premises gateway apparatus and features of the present invention.

Switching architectures allow improved efficiency of bandwidth use for ordinary digital broadcast programs. Ideally, the subscriber is unaware of any difference between programs delivered using a switched network and ordinary streaming broadcast delivery.

FIG. 1c shows the implementation details of one exemplary embodiment of this broadcast switched network architecture. Specifically, the headend 150 contains switched broadcast control and media path functions 190, 192; these element cooperating to control and feed, respectively, downstream or edge switching devices 194 at the hub site which are used to selectively switch broadcast streams to various service groups. A BSA server 196 is also disposed at the hub site, and implements functions related to switching and bandwidth conservation (in conjunction with a management entity 198 disposed at the headend). An optical transport ring 197 is utilized to distribute the dense wave-division multiplexed (DWDM) optical signals to each hub in an efficient fashion.

Co-owned U.S. patent application Ser. No. 09/956,688 filed Sep. 20, 2001 and entitled "Technique for Effectively Providing Program Material in a Cable Television System", issued as U.S. Pat. No. 8,713,623 on Apr. 29, 2014, incorporated herein by reference in its entirety, describes one exemplary broadcast switched digital architecture useful with the present invention, although it will be recognized by those of ordinary skill that other approaches and architectures may be substituted.

In addition to "broadcast" content (e.g., video programming), the systems of FIGS. 1a and 1c (and FIG. 1d, described below) also deliver Internet data services using the Internet protocol (IP), although other protocols and transport mechanisms of the type well known in the digital communication art may be substituted. One exemplary delivery paradigm comprises delivering MPEG-based video content, with the video transported to user PCs (or IP-based STBs) over the aforementioned DOCSIS channels comprising MPEG (or other video codec such as H.264 or AVC) over IP over MPEG. That is, the higher layer MPEG- or other encoded content is encapsulated using an IP protocol, which then utilizes an MPEG packetization of the type well known in the art for delivery over the RF channels. In this fashion, a parallel delivery mode to the normal broadcast delivery exists; i.e., delivery of video content both over traditional downstream QAMs to the tuner of the user's STB or other receiver device for viewing on the television, and also as packetized IP data over the DOCSIS QAMs to the user's PC or other IP-enabled device via the user's cable modem.

Referring again to FIG. 1c, the IP packets associated with Internet services are received by edge switch 194, and forwarded to the cable modem termination system (CMTS) 199. The CMTS examines the packets, and forwards packets intended for the local network to the edge switch 194. Other packets are discarded or routed to another component.

The edge switch 194 forwards the packets receive from the CMTS 199 to the QAM modulator 189, which transmits the packets on one or more physical (QAM-modulated RF) channels to the CPE. The IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

"Packetized" Networks—

Figure 1D:
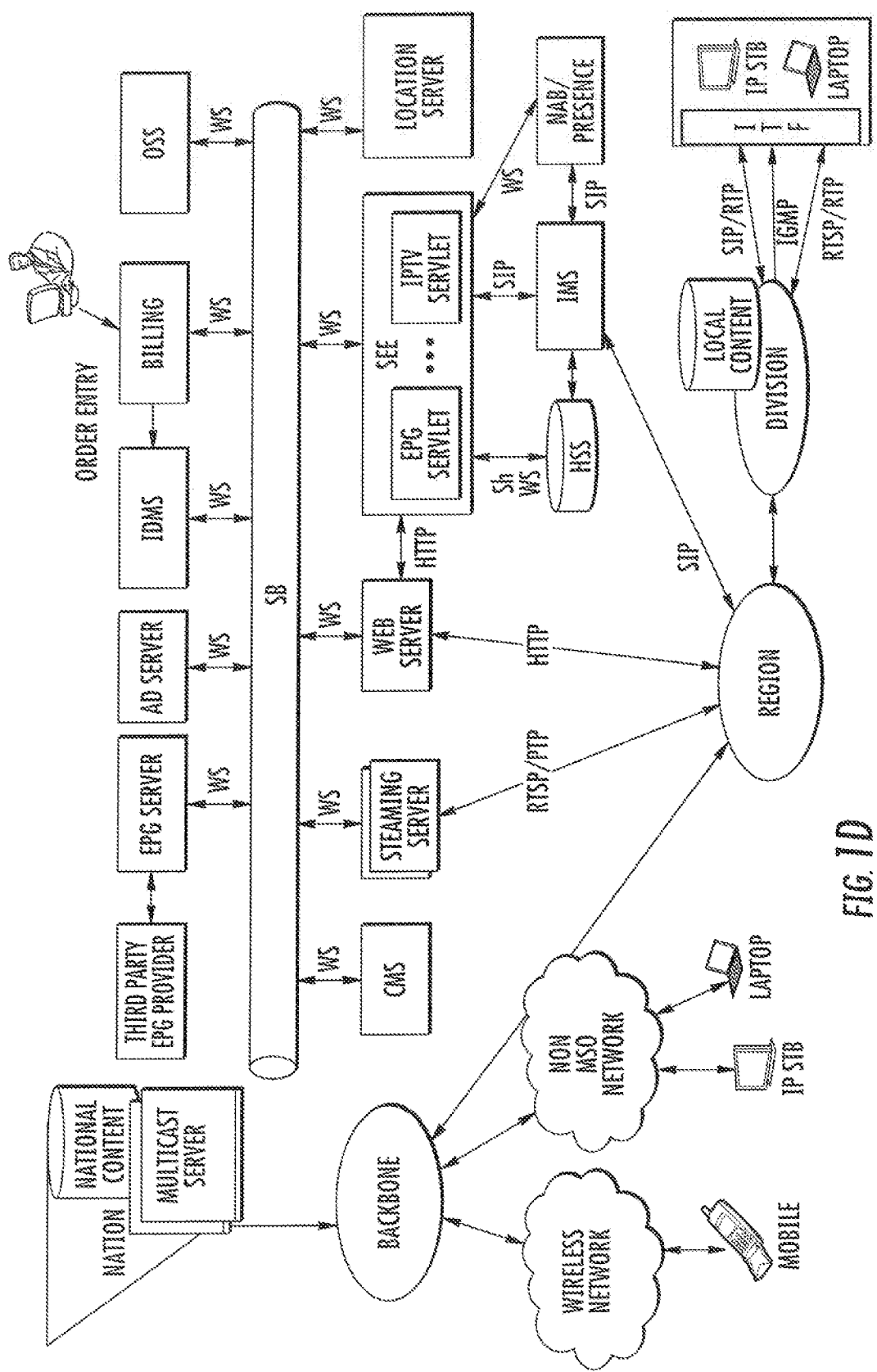
FIG. 1d is a functional block diagram illustrating one exemplary packetized content delivery network architecture useful with the present invention.

While the foregoing network architectures described herein can (and in fact do) carry packetized content (e.g., IP over MPEG for high-speed data or Internet TV, MPEG2 packet content over QAM for MPTS, etc.), they are often not optimized for such delivery. Hence, in accordance with another embodiment of the present invention, a "packet optimized" delivery network is used for carriage of the packet content (e.g., IPTV content). FIG. 1d illustrates one exemplary implementation of such a network, in the context of a 3GPP IMS (IP Multimedia Subsystem) network with common control plane and service delivery platform (SDP), as described in co-owned U.S. patent application Ser. No. 12/764,746 filed on Apr. 21, 2010 entitled "METHODS AND APPARATUS FOR PACKETIZED CONTENT DELIVERY OVER A CONTENT DELIVERY NETWORK", which claims the benefit of priority to U.S. provisional patent application Ser. No. 61/256,903 filed on Oct. 30, 2009 and entitled "METHODS AND APPARATUS FOR PACKETIZED CONTENT DELIVERY OVER A CONTENT DELIVERY NETWORK," each of which is incorporated herein by reference in its entirety. Such a network provides significant enhancements in terms of, inter alia, common control of different services, implementation and management of content delivery sessions according to unicast or multicast models, etc.; however, it is appreciated that the various features of the present invention are in no way limited to any of the foregoing architectures.

Exemplary Pre-caching Architecture—

Figure 2:
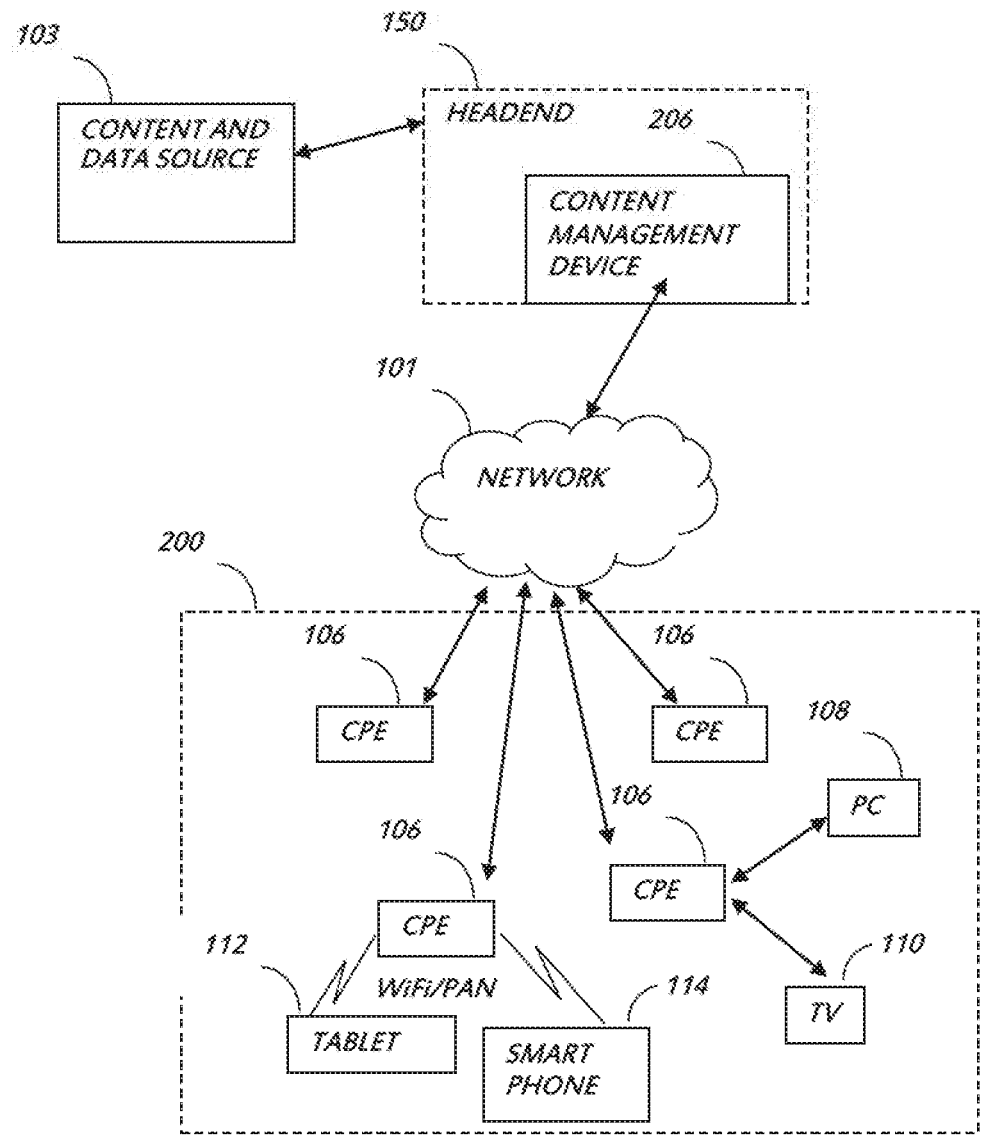
FIG. 2 is a functional block diagram illustrating an exemplary embodiment of a HFC network for providing content to a plurality of consumer premises equipment according to the present invention.

Referring now to FIG. 2, an exemplary embodiment of a pre-caching architecture 200 for providing content to a plurality of CPE 106 in a service area according to the present invention is illustrated. As noted, while described herein in the context of a hybridized (i.e., fiber and wireline conductor such as coaxial cable) extant network topology such as that of FIGS. 1-1d discussed above), the present invention is in no way so limited, and in fact may be utilized within literally any type of network or topology.

As discussed above, a typical hybridized network includes one or more data and application origination points, one or more content sources, one or more application distribution servers, and one or more VOD servers at a network headend. The distribution server(s), VOD servers, and content sources to a plurality of CPE connected via the bearer (e.g., HFC) network. The headend may also connect through a gateway or other such interface to unmanaged external internetworks such as the Internet.

The CPE within such networks may also be operatively coupled to one or more user or client devices (e.g., wireless mobile devices, PCs, tablets, etc.) at the user premises. The user may wish to receive or view content obtained via the content delivery network on any of these devices.

The users associated with the plurality of CPE request content from the content server via the network. Then, assuming the CPE has proper access privileges, the content will provided over the network. Thus, the plurality of requesting CPE can have individualized content streams provided to them. However, during peak usage periods, such as those often occurring from 7 pm to 11 pm in the evening within a given time zone, the provision of these individualized streams can consume all or a significant portion of the available network resources.

To alleviate this condition, various implementations of the present invention utilize content management devices 206 placed on the headend and/or other content servers. The content management devices allow for, inter alia, the provision of non-linear content that is shifted to off-peak periods using a pre-caching process. In one exemplary embodiment, content with a high probability of viewership (HpoV) for a given CPE is sent to that CPE, typically during an off-peak period, and stored prior to viewing. Thus, the user associated with the CPE can experience the high performance associated with low latency content interaction given the local storage of the content. Moreover, as will be discussed infra, this experience can be achieved using significantly less bandwidth than that which may be associated with the bitrate of the encoding used for the content or the bandwidth associated with its execution. Thus, a low bandwidth transmission or "trickle" download can be used. Furthermore, often increasing storage capacity is a more economical option than increasing the instantaneous bandwidth capacity of the network. Because it facilitates the transfer of bandwidth usage to low demand periods, the present invention allows an MSO to improve the general user experience through the increase of storage rather than increasing the instantaneous bandwidth capacity of the network.

It will be appreciated that while exemplary embodiments of the invention are described herein with respect to local storage (i.e., storage of the transmitted non-linear content on the user's premises, such as on a DVR or the like), the invention also contemplates use of more remote storage, yet consistent with the intended goal of peak bandwidth use reduction. For instance, in one variant, the content is downloaded and stored at storage devices (not shown) disposed at local switching or distribution hubs, the hubs being located at or near the edge of the operator's distribution network. In this fashion, bandwidth limitations (such as those due to peak demand periods) occurring at or near the core of the network—which are most typical—are effectively addressed, yet the content is still maintained within the operator's network (versus being disposed within the less controlled environment of the subscriber's premises). This form of "edge caching" also advantageously does not require the subscriber's CPE to be operating to function, since the content is only streamed from the edge cache to the subscriber when the user requests it.

In yet another variant, the content is downloaded and stored on a storage device of another subscriber or CPE (versus the target subscriber/CPE on which the HpoV analysis was based). In this fashion, the other subscriber's CPE acts as another "edge" repository. Exemplary methods and apparatus for such peer caching are disclosed in co-owned U.S. patent application Ser. No. 11/726,095 filed Mar. 20, 2007 and entitled "METHODS AND APPARATUS FOR CONTENT DELIVERY AND REPLACEMENT IN A NETWORK", incorporated herein by reference in its entirety. The aforementioned application details techniques for edge or near-edge peer-to-peer storage and transfer of content. The exemplary techniques are used to facilitate the integration of such edge repositories and offer the MSO or other network administrator more flexibility in provisioning upstream/downstream bandwidth. However, it would be recognized by those of ordinary skill given this disclosure that other approaches and architectures may be substituted.

Exemplary Bandwidth Management Apparatus—

Figure 3:
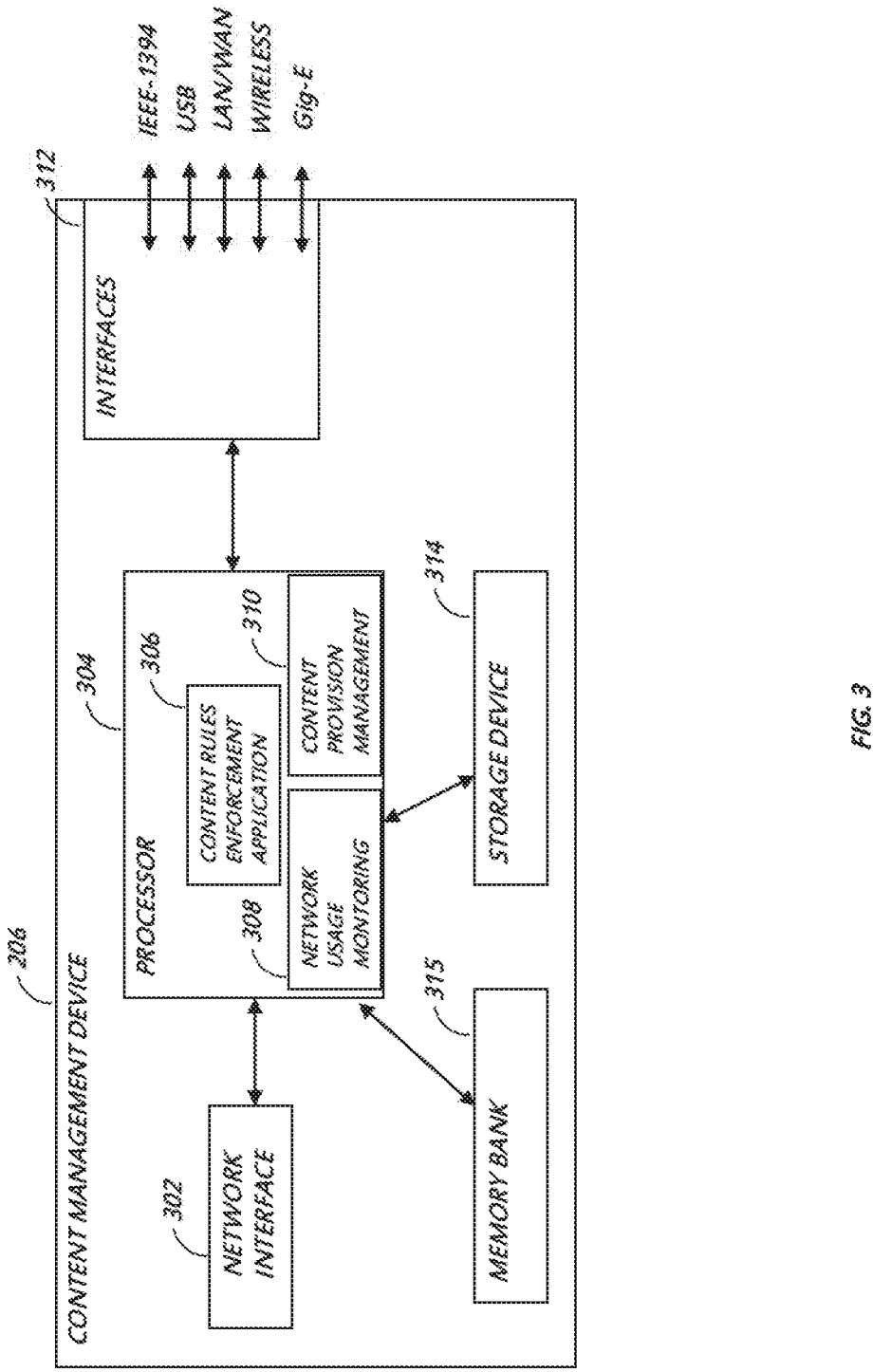
FIG. 3 is a functional block diagram illustrating an exemplary content management device for use in the present invention.

Exemplary embodiments of the content management apparatus 206 shown in the pre-caching architecture of FIG. 2, are now described in detail with respect to FIG. 3.

As shown in FIG. 3, the content management apparatus (CMA) 206 generally includes a network interface 302, a processing unit 304, a storage unit 314, and a number of interfaces for connection with external devices 312. In the embodiment shown in FIG. 3, the apparatus is designed for use at the headend 150 of the content delivery network 100 of FIG. 1, and is in (indirect) communication with a plurality of CPE 106. The processing unit runs several processes regarding the management and distribution of content, as described in greater detail subsequently herein.

Applications 306 and 310 running at the apparatus 206 process new content, and extract any information related to the classification of the content and rules for the presentation and distribution of the content. This classification information may include data such as for example: (i) type of content (e.g. movies, TV, music, applications, games, etc.) (ii) the subject matter of the content, (iii) genre of the content (iv) demographic information on a typical audience for the content, (v) suitability for different audiences (e.g. rating), (vi) total runtime/playtime, (vii) release date, (viii) author/creator, (ix) uploader (e.g. in the case of user produced content) and/or (x) lists of other directly related content. For example, a movie which is a sequel to another might list its predecessor in the list of related content.

The rules related to the presentation and distribution may include instructions (potentially from the content source, or an agreement binding the MSO) that detail: (i) if the content can be distributed prior to its initial scheduled broadcast or release, (ii) what types of security or DRM must be attached to the content, (iii) what types of reformatting are allowed for the MSO and the end user, (iv) what client devices (e.g., types of devices) may display the content, and (v) what limitations on copying and/or distribution must be enforced. These rules can then be implemented through tools such as flags, metadata, and/or encryption. Use of so-called "trusted domains" may also be employed to enforce one or more of the foregoing rules. Co-owned U.S. patent application Ser. No. 10/894,884 filed Jul. 20, 2004 and entitled "Technique for securely communicating and storing programming material in a trusted domain", issued as U.S. Pat. No. 8,266,429 on Sep. 11, 2012, and U.S. patent application Ser. No. 11/378,129 filed Mar. 16, 2006 and entitled "METHODS AND APPARATUS FOR CENTRALIZED CONTENT AND DATA DELIVERY", issued as U.S. Pat. No. 8,347,341 on Jan. 1, 2013, each of which is incorporated herein by reference in its entirety, describe exemplary methods and apparatus for deploying such a trusted domain architecture; however, it will be recognized by those of ordinary skill that other approaches and architectures may be substituted.

The application responsible for extracting the classification information 310 is utilized in this exemplary embodiment to manage decisions related to content provision. The computer program identifies content that is likely to be of interest users associated with respective CPE, and schedule provision of that content. The computer program has access to both the classification information related to the content (described above), and corresponding information associated with the individual ones of the plurality of CPE (or individual users thereof). This corresponding information can include for example data such as: (i) express user requests (e.g. content queued or otherwise identified by the user as being content the user intends to view at a later time), (ii) user history, (iii) user preferences or interests (such as those expressed explicitly by a user, such as during account creation or subsequent surveys, and/or passive determinations based on e.g., history of activity such as frequently watching the Golf Channel), (iv) geographic location and/or (v) demographic/psychographic information (i.e., knowledge of one or more persons attitudes, actions, behaviors, interests, etc.). The program will then analyze (e.g., compare, or run other analytics on) these two sets of information to identify HpoV content.

The exemplary embodiment of the content provision scheduling process takes into account current network usage, and/or network usage cycles. Accordingly, this process (or another designated process) 308 must collect and organize data on network usage statistics. This collection and organization can be achieved by adapting the apparatus to process such data, or supplying the statistical data from a separate system. With this data, the system produces a guide for expected network usage. Then, the system will develop a plan for optimal scheduling of transmission of content to CPEs (including the use of trickle downloads during off-peak periods).

It will be appreciated that in certain embodiments of the invention, the aforementioned usage/cycle data can be gathered and processed as necessary by another process or entity within the operator's network, or even a third party, and fed to the management apparatus 206. Moreover, the management process 206 is not limited to using data that is specific to or derived from the operator's own network. For example, more generalized data regarding user behavior (such as from Nielsen or the like), and/or data obtained from other network operators, may be used consistent with the invention for both (i) identifying HpoV content, and/or (ii) characterizing network usage and behavior (including peaks or spikes in demand). Additionally, speculative or predictive means of assessing network usage and/or behavior may be used, such as those discussed in co-owned U.S. patent application Ser. No. 11/800,093 filed May 4, 2007 and entitled "METHODS AND APPARATUS FOR PREDICTIVE CAPACITY ALLOCATION", issued as U.S. Pat. No. 9,398,346 on Jul. 19, 2016, previously incorporated by reference herein.

The storage unit 314 of the device is specifically configured to facilitate the processing and management of the content, and the application of any rules such as those discussed above. In some embodiments, the content is stored on the apparatus 206 to facilitate distribution to various associated CPE. In these configurations, the capacity must be sufficient or capable of being expanded such that numerous HD content streams may be stored and processed for distribution. In other embodiments with remote content storage, the storage unit 314 capacity must be sufficient to allow the system to direct transfers from other servers. The storage system must also be configured such that any rules associated with any given content will remain associated after storage, including situations in which the rules are provided or stored as a separate file or stored at a device remote from that which stores the content. It will be appreciated that in some embodiments, the storage unit 314 can comprise multiple modules for various tasks. For example, a faster RAM-disk type module could be included in the storage unit to facilitate faster paging operations during tasks such as video processing or content metadata generation. It can be envisioned that such a RAM-disk module in concert with mass storage modules for content storage tasks allow for expanded device flexibility.

In other embodiments, the content is stored remotely, and the apparatus then directs transfer of the content to one or more target CPE.

In addition, the storage unit can also be configured to store the classification information associated with the content and the corresponding information associated with the individual ones of the plurality of CPE associated with the management apparatus. Storing such information will facilitate the identification of HpoV content.

The content management apparatus 206 also supports a memory bank 315 to support application actively running thereon. Thus, the memory requirements of the various tasks (e.g. rule enforcement, video streaming, direction of transfers, and content processing, etc.) performed by the content management apparatus 206 are fulfilled.

In some embodiments of the invention, some or all of the processing necessary to identify HpoV content will be located at the CPE, as opposed to the CMA 206. Hence, the present invention contemplates: (i) all of the necessary HpoV/scheduling processing being performed at the network side (e.g., the CMA); and (ii) a division of the aforementioned processing between the network side (e.g., CMA) and the CPE 106.

Figure 4:
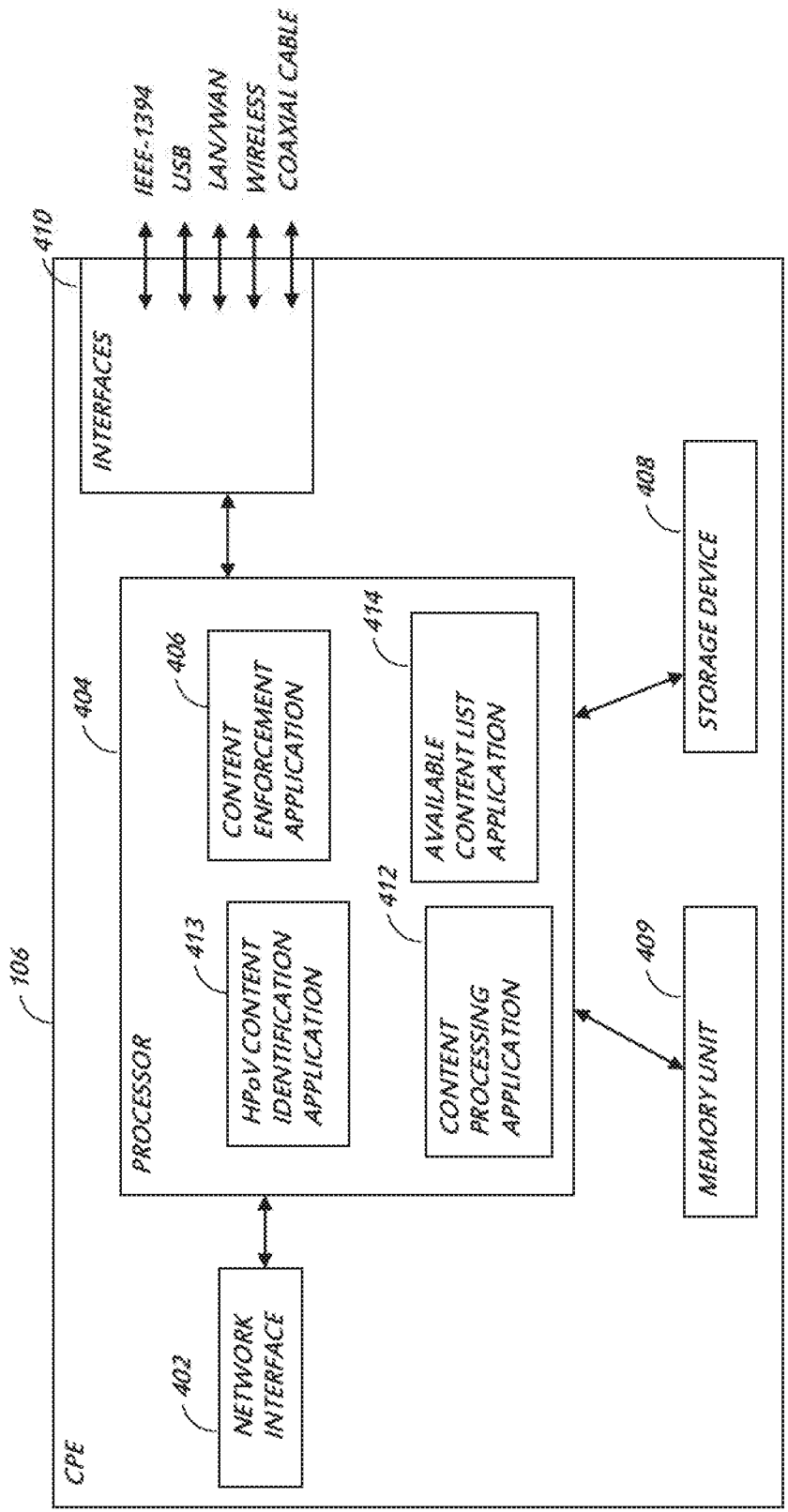
FIG. 4 is a functional block diagram illustrating an exemplary client device for use in the present invention.

Referring now to FIG. 4 an exemplary CPE apparatus 106 having HpoV processing capability is shown. The processing capability can be e.g., a module (e.g., dedicated processor) placed into a larger CPE, or it can operate as a separate device, as will be readily appreciated by those of ordinary skill given the present disclosure.

This apparatus 106 generally includes a processing unit 404 with a number of applications running thereon, a network interface 402, a storage unit 408, a memory unit 409, numerous interfaces or connections 410 for connecting to the MSO's network (and various client devices located on the premises, such as mobile devices, personal computers, DVRs, etc.)

The storage device 408 is configured to store any variety of information/data for use by the apparatus 106, including content for presentation, provide a buffer for live streams, and store rules guiding the presentation of the content. In some cases, the storage unit is further configured to store classification information related to particular content and information related to the one or more users of the CPE.

The memory unit 409, is configured to provide fast memory access for the application of rules, video processing, identification of HpoV content, or any number of programs or processes running on the CPE.

In operation, the CPE receives a list identifying content available for presentation from the content server or other network entity. This information may also be pre-stored, such as from an earlier EPG fetch. The available content process 412 extracts information from this list, which can include the classification information discussed above. The information can be used to generate e.g., a VOD availability list for presentation to the user, and an EPG can be compiled from the data. Thus, the fetched information can serve multiple purposes and need not only be envisaged in the context of identifying HpoV content.

The available content process 412 then passes the list of available content and classification information to the HpoV content identification process (application) 413. The HpoV content identification application 413 then uses the list and classification information to identify content that is likely to be consumed by the "CPE" (or specific users associated with the CPE). In this case, the HpoV content identification application must have access to information related to the CPE's use (or in the case of user-specific profiling, information about specific ones of the CPE's associated users). Some of this information can be collected during the operation of the CPE. For example, the HpoV content identification application could direct the collection of user requests and user history. Moreover, the application could query the user for information related to user preferences or demographic information.

The HpoV content selections can in another embodiment be tailored to specific entities via selectable profiles associated with the CPE, a user (or multiple users), or other network entity. Co-owned and/or co-pending U.S. patent application Ser. No. 12/414,554 filed Mar. 30, 2009 and entitled "PERSONAL MEDIA CHANNEL APPARATUS AND METHODS" and U.S. patent application Ser. No. 12/414,576 filed Mar. 30, 2009 and entitled "RECOMMENDATION ENGINE APPARATUS AND METHODS", issued as U.S. Pat. No. 9,215,423 on Dec. 15, 2015, each of which being incorporated herein in their entirety, describe exemplary embodiments of these specific entity profiles capable of use in predicting interest in content. Thus, in some embodiments, it can be envisaged, that a user may have multiple profiles for e.g., different times of day or mood of the user. Additionally, profiles of users may be used to generate predictions of HpoV content for other users. Further, content may be immediately identified as HpoV content with the assumption that a certain user may want to "watch-along" with another. Such is often the case with children of the user. Alternatively, a user may want to follow the viewing habits of a celebrity (movie/TV celebrity, politician, journalist, business mogul, etc.) or other influential public figure. Accordingly, HpoV content can be identified from the playlists/recommendations made for or by these celebrities.

The HpoV content identification application then directs the CPE to contact the content server or other appropriate network entity to schedule transmission of the HpoV content. The list of available content discussed above can include details about scheduling and mode of transmission of the content, such as the earliest possible date and time for transmission, or delivery modality restrictions. Thus, in some embodiments, the CPE will only request content when it is available for transmission, and by only those modes detailed in the content availability list.

Alternatively, this information may not be included in the list. In this case, the CPE may request a type of transmission that is not allowed. For example, the CPE may request a trickle download in advance of the presentation of particular content, but only a live stream may be allowed. Accordingly, the content management apparatus 206 associated with the content server will deny the request, and can suggest an alternative method or time of transmission.

In addition, the management apparatus 206 can also deny such a request in order to facilitate bandwidth management on the network. Ideally, the CPE 106 will request trickle downloads during periods of low network resource demand. However, without detailed network usage statistics and history, it is not possible to fully identify all times of high network demand. Generally, updated or detailed forms of this information will not be fully available to the CPE. Thus, the CPE may make requests at inappropriate times, even in the cases in which the CPE is running a process to identify such periods. Therefore, in the exemplary embodiment, the management apparatus 206 running on the network must have precedence in any transmission scheduling decision.

Notwithstanding, it will be appreciated that the CPE may in alternate embodiments of the invention be provided such updated and detailed network demand information if desired. In this fashion, the CPE acts in effect as a remote or "edge CMA", decentralizing the function of the network-based CMA 206 so that individual CPE can more intelligently manage and select content delivery and downloads. This approach may also be selectively applied throughout the pool of CPE within the operator's network, such that only certain CPE are so equipped. For instance, "thinner" CPE with less capability, or which have opted out of (or not opted into) acting as an edge CMA will in effect be "dumb" CPE, and receive their downloads based entirely on network-based CMA 206 instructions and scheduling. However, CPE with full processing capability and access to network data as described above, and which are elected to act as edge CMA's, will schedule their own downloads and make their own determination of content availability. These edge CMA devices may in one variant act fully autonomous of other scheduling decisions or information generated by the network-based CMA 206, or alternatively in another variant may coordinate with the network CMA 206 to ensure that broader network operational or bandwidth conservation rules are not being violated.

Methodology—

Figure 5:
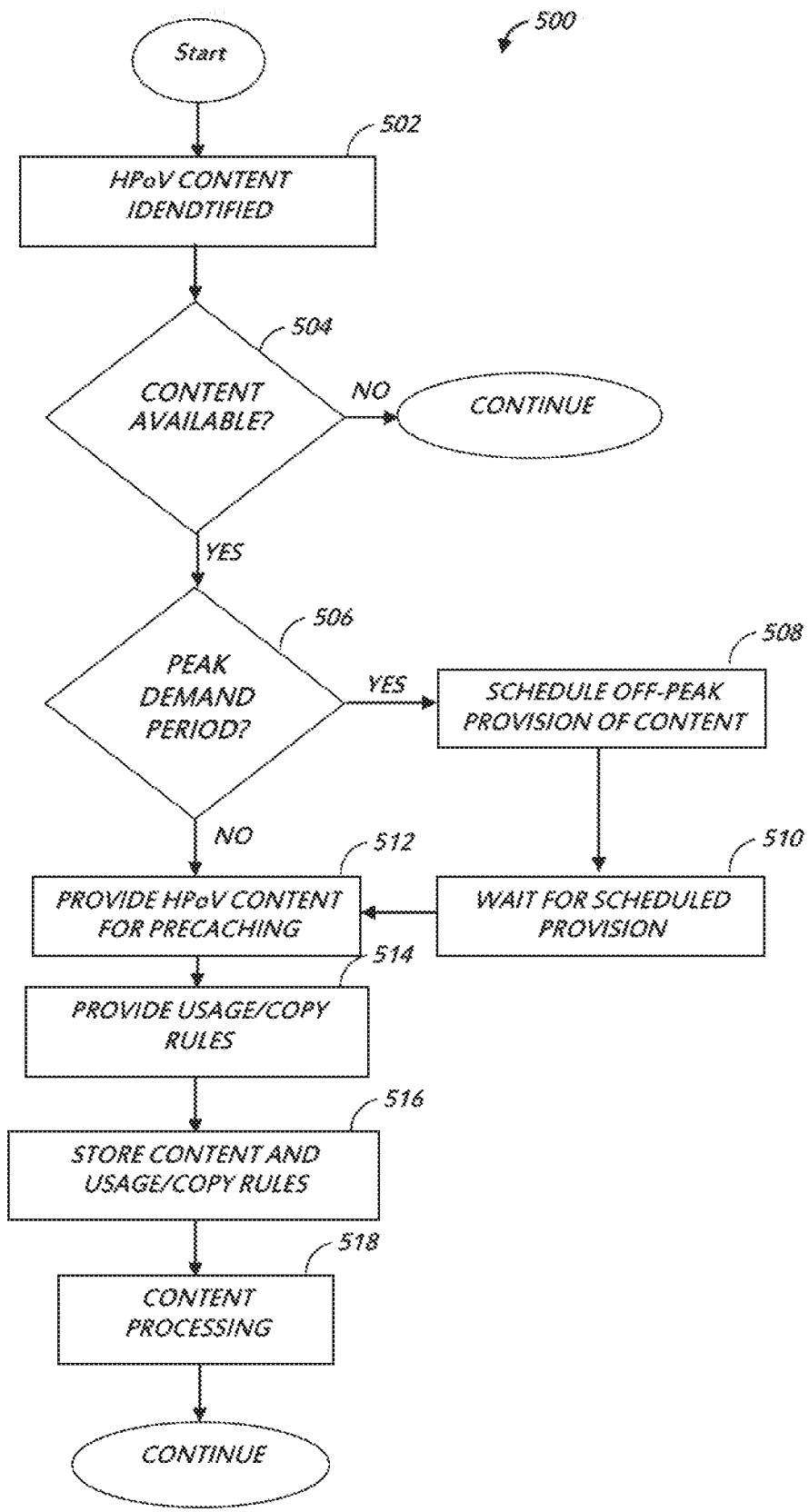
FIG. 5 is a logical flow diagram illustrating an exemplary method for managing the provision of content to a plurality of devices associated with a service group according to the present invention.

FIG. 5 illustrates an exemplary embodiment of a method 500 for providing content in a network in accordance with the present invention. As illustrated, per step 502, HpoV content is first identified. The processes by which this identification can be achieved is discussed in detail later in this section.

Once the HpoV content is identified, the content server 201 is queried as to the availability of HpoV content per step 504. Alternatively, a total list of content available on the content server can be used to limit the determination of HpoV content to those programs available on the server. Furthermore, in some embodiments, a schedule setting forth the predicted time of availability of upcoming content can be provided. If the content is not or will not be available, the process will recommence when another HpoV content identification is made.

Next, at step 506 of the method 500, it is determined if the time at which the HpoV is identified constitutes a period of peak or high demand for network resources. If it is determined that the current period does constitute a high demand period, or some other reason arises for the preservation of network resources, an off-peak provision of the content will be scheduled at step 508. Otherwise, the content is provided immediately.

The foregoing scheduling process can occur in a number of ways. For example, the provision of the content can be scheduled based on a foreseeable reduction in demand for the resources of the network such as late at night or early in the morning. Alternatively, such scheduling need not be based on a specific time, but rather the occurrence of an event, such as e.g., network usage or activity falling below a certain threshold. As mentioned above, under one exemplary embodiment of the invention, the content can be provided using less bandwidth that would be required for live or streaming viewership (e.g., trickle download). Thus, the scheduling of the provision may also take into account the time necessary to transmit the content using a trickle download while still ensuring that the transmission completes before the user is likely to view the program.

Conversely, if network resources (bandwidth) have freed up sufficiently during schedule periods of download, a high-speed modality for download of the content may be used instead, such as that described in co-owned U.S. patent application Ser. No. 11/013,665 filed Dec. 15, 2004 and entitled "METHOD AND APPARATUS FOR HIGH BANDWIDTH DATA TRANSMISSION IN CONTENT-BASED NETWORKS", issued as U.S. Pat. No. 8,522,293 on Aug. 27, 2013, incorporated herein in its entirety. Thus, the system uses protocols and bandwidth typically associated with VOD sessions rather than lower speed modalities. The transfer can then reach completion during the period of plentiful network resources prior to any return to a period of high network demand.

At step 512, the HpoV content is provided for pre-caching. The content is stored locally at the CPE (or alternatively at another CPE, or an edge cache, as previously discussed), and the user will be able to enjoy the content with little or no further network usage. Thus, the system will have the added effect of being more robust against poor customer experiences resulting from outages or overtaxed network resources, since the content uses little if any network infrastructure.

Furthermore, given that the provision of content occurs without active viewership in the case of some exemplary implementations of the invention, the transmission of the content can advantageously be interrupted and/or rescheduled if demand for network resources peaks during an unforeseeable period.

Per step 514, usage and copying rules are provided in addition to the content. These rules may be used to, among other things, enforce various agreements among the content provider, the MSO, and the subscriber. For example, certain pre-cachable content may be made available for pre-caching in advance of its scheduled release or broadcast. Thus, the content can be in place for consumption the as soon as allowed per the aforementioned agreements. However, to avoid situations in which a user accesses the content ahead of the agreed upon schedule, rules can be put in place. These rules may limit both the earliest time and the duration over which the content can be consumed, limit access to the content to only previews or "trailers", limit access to only portions of the content (e.g., audio only, video only), etc.

In addition, referring again to FIG. 2, the CPE 106 may be operatively coupled (via e.g., wired or wireless link) to a number of client devices in the user's possession, including PCs 108, TVs 110, tablet computers 112, and smartphones 114. Thus, the user may wish to consume the content on any number of these devices. However, viewing the content on these devices may require specific permission from the MSO or content provider. Therefore, the usage and copying rules can be set to govern what devices the content can be viewed on, and permissions associated with the use of such content on such devices (e.g., no replication or transfer from that device to another device, etc.).

Finally, the user may wish to move the content to another storage medium. For example, the user may desire to transfer the content to a portable device for enjoyment at another location. The rules would also cover this situation.

In order to enforce such rules, various tools may be used. In one variant, the content may be flagged for different types of usage or copying. Flagging may include actions such as altering the metadata of the content to reflect the rules. Alternatively, data files containing sets of preferences or other indicators may be associated with the content. The content presentation may also be limited to specific devices that will not allow unauthorized use or copying. For example, playback may be limited to devices authorized directly by an authorization program running on the content management apparatus 206. Alternatively, with secure presentation standards (e.g. HDCP and/or digital rights management DRM tools, etc.) may be required for display of the content.

Also, the content may be transmitted in an encrypted form (e.g., using public/private key encryption, or another symmetric or asymmetric encryption technique such as AES) without also transmitting the encryption key. This will prevent consumption of the content until the key is provided. The encryption key can then be provided at the time of the release or scheduled broadcast to allow for the initial presentation of the content. In addition, the key can be provided to facilitate authorized copying or device transfers. Co-owned and co-pending U.S. patent application Ser. No. 10/894,884 and Ser. No. 11/378,129 each of which previously being incorporated by reference herein, discuss exemplary techniques for such secure/authorized copying or device transfers. Alternatively, it will be recognized by those of ordinary skill that other approaches and systems may be used.

To further present content providers with tools for the management of pre-cached HpoV content, security measures may be implemented as part of the pre-caching process. In some embodiments, the content is pre-cached in an incomplete or substantially incomplete form. For example, in one variant, a selected portion (e.g., every other bit, every third bit, contiguous blocks of n bits out of m total bits, etc.) of a particular digitally encoded content element may be locally stored on a CPE prior to an "unlock" date for that content (e.g., a release date). Thus, until the complementary (e.g., non-present) set of bits are provided, the data is rendered unusable. However, the (present) portion of the data may still be pre-cached, and the network usage (load) at the unlock date (or sometime after) is none-the-less reduced, in that the network need only deliver the remaining (non-present portion to the CPE, versus the entire content element.

In other variants, a byte-wise (rather than bit-wise) division may be used.

Still further, a redundancy analysis may be used to identify data critical to playback/execution. In one such implementation, only the minimum data needed to frustrate or sufficiently degrade playback/execution is intentionally not pre-cached.

In yet other embodiments, the content may be analyzed for optimal withholding. For example, many video encoding schemes rely on independent frames and (partially-) dependent frames. For the purposes of decoding video, dependent frames are reliant on information from the independent frames to be fully rendered. The dependent frames may merely contain change or "vector" information detailing their differences from a previous or successive frame. The dependent frames may be unusable without the "reference" independent frames. In some implementations (e.g., H.264), the frames are called I-frames (independent), P-frames (predictive, uni-directionally dependent), and B-frames (bi-directionally dependent). Thus, some or all independent and/or partially-dependent frames may be withheld to prevent (or substantially reduce) the quality of unauthorized playback. To that end, the quality may be purposely reduced to a "grainy" resolution for purposes of preview or enticing the user to view it; e.g., the user is provided access to all or a portion of the content in reduced resolution, such that it can be rendered and viewed on their screen, but in order to obtain the full (high-resolution) playback, the user must take additional action (e.g., affirmatively select the content element, upgrade their subscription, pay a fee, etc.). This feature also provides a low-bandwidth and storage size preview function; i.e., various content elements can be cached at some fraction of the full-resolution size, and the user can browse them, viewing low-resolution versions, and upon selection of one, the remaining (complementary) portion of data can be downloaded and rendered with the existing portion as a whole.

Consistent with the present invention, any or all of the aforementioned security measures (encryption, flagging, DRM, or incomplete prepositioning) may be applied in concert with one another.

Referring again to FIG. 5, the content and rules will then be stored per step 516. Also, at step 518, the CPE may pre-process the content to facilitate viewing on the authorized device or devices, such as for example decrypting and decoding the content, transcoding it (for a different indigenous codec for example), upconverting it to HD or downconverting it to SD from HD if required, etc. This will ensure that at the authorized/desired time of viewing the user will be able to enjoy a high-performance presentation without latency due to transmission or processing.

Figure 6:
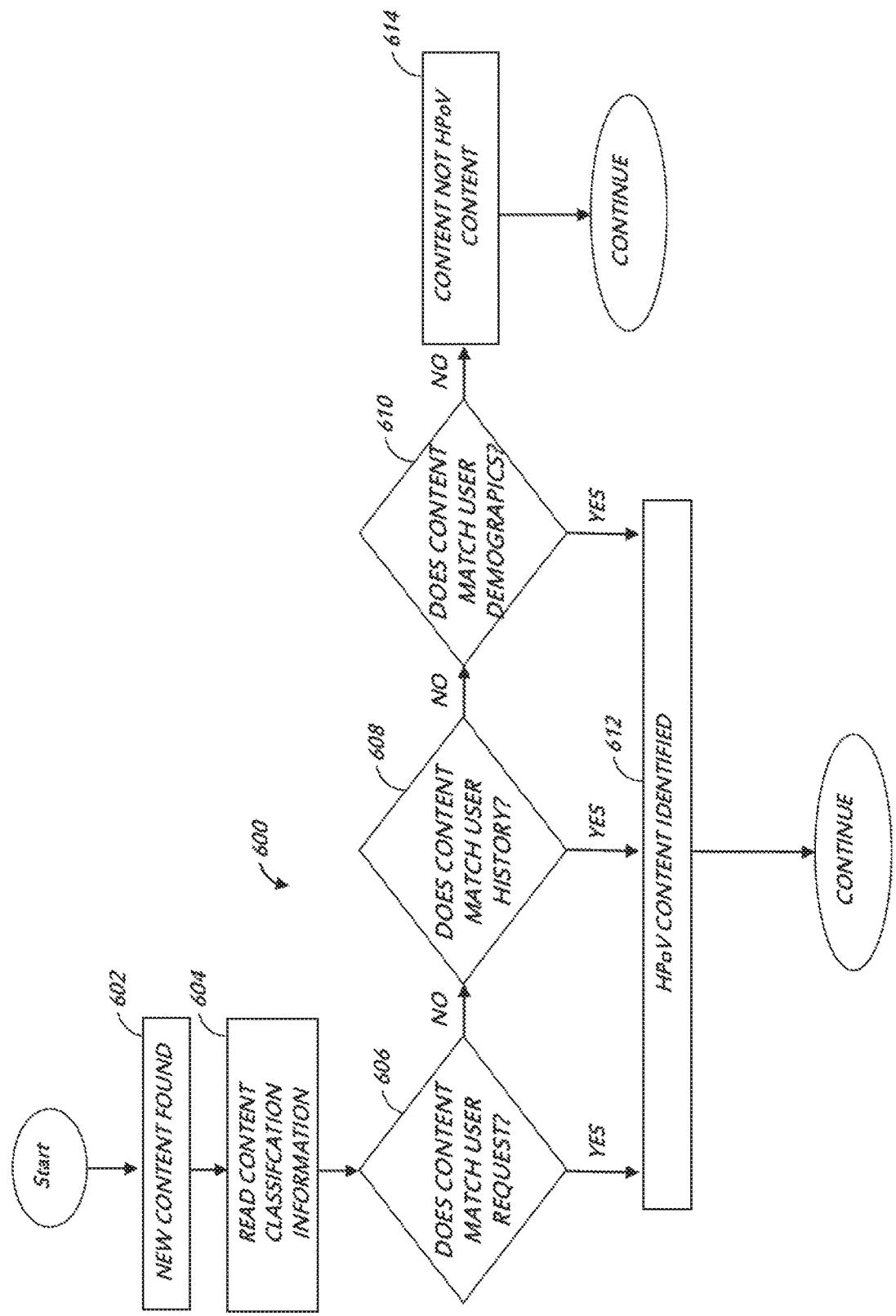
FIG. 6 is a logical flow diagram illustrating another embodiment of the method for identifying high probability of viewership content for a plurality of devices associated with a service group according to the present invention.

FIG. 6 illustrates an exemplary embodiment of a method 600 for identifying HpoV content in a network in accordance with the present invention.

At step 602, new content is identified, and the information related to the classification of the content is read (step 604).

Per step 606, the content is evaluated to determine whether it is "match" for a user request. As used herein, the term match includes without limitation evaluation against one or more criteria to determine suitability, scoring or ranking, fuzzy logic analysis (e.g., "good", "fair", "poor"), and so forth. The user request may have been made individually for the specific content, or as part of a queue of content that the user plans to view in the near future. In addition, the request could also be made as part of a "subscription" to serial content. For example a user may request to pre-cache every episode of a season of a television program.

If the content does not match a specific request from a user, the content classification information can be compared to the subscriber history per step 608. Often, from the subject matter of the content, a list of related content can be generated. A subscriber that has previously consumed content related to the new content may likely desire the content in question. Moreover, because of the serial nature of many programs it may be simple to predict a subscriber's habits. For example, a subscriber that has watched every previous episode of a specific television program will likely watch the newest episode even if that episode was not specifically requested.

At step 610, if the new content yields neither a request nor history match it may be evaluated for a demographic match to the subscriber. Often behavior can be predicted based on the demographic details of a subscriber household. Thus, a CPE with associated demographic information can be compared to demographic information contained within the classification information associated with the new content. For example details such as age, household income, and education level can be used to predict the likelihood of interest for given content.

Content may be aggregated by the MSO and provided to the subscriber. However, in some embodiments, content may be sourced from over-the-top (OTT) providers (providers that distribute content over the MSO's network, but do so independently (or substantially independently) of the MSO (e.g. Hulu®, Facebook®, NetFlix®, or YouTube®). These content providers may have pre-identified HpoV content, which they wish to deliver to particular subscribers (or those having prescribed demographics/psychographics) on the MSO's network. Consistent with the present invention, the OTT provider may coordinate with the MSO to pre-position their HpoV OTT-content on the user's CPE, such as e.g., by providing the MSO with a correlation matrix specifying content versus particular users (or user demographic/pyschographic parameters).

In other embodiments, the MSO may obtain the permission of the subscriber or the OTT provider (or in some cases a third party information aggregator) to "mine" request lists, queues, user history, preferences, or recommendation lists maintained by the OTT provider. These lists may serve as sources of information on user likes and dislikes, and may be used to increase the accuracy and/or amount of content able to be recommended for a user.

If a match is found in any of the above steps the content will be identified as HpoV content. However, if match is not found the content will be deemed not HpoV and will not be pre-cached. Although, only three evaluation steps have been noted, this is not meant to limit the scope by which the content can be evaluated. One can envision myriad other methods of evaluating new content. Most notably, evaluation based on user defined preferences for subject matter could be used as grounds for identifying HpoV content. However, the MSO may want to limit the number of criteria used at any one time so as to not generate too many false positives resulting in wasted bandwidth usage for content not of interest to the user. Furthermore, to mitigate the occurrence of false positives the MSO may require a match in more than one criterion. Thus, the chances of undue network usage will reduced given the chances of more than one match will be lower than a single match, and the results will be more likely to be of interest to the user.

It can also be envisioned that a user may initiate the presentation of HpoV content prior to the completion of a scheduled trickle download. In this case, the transmission rate associated with the trickle download may be increased (e.g. doubled or tripled) to ensure that the user does not reach the end of the portion of the content that has been transmitted and have to wait for the trickle download to complete. In some embodiments, the CPE 106 or content management device prevents the user from initiation of viewership until the content download is complete or sufficiently complete that the content can be presented without interruption with or without increasing the transfer rate.

Additionally, in some embodiments the decision whether or not to increase the transmission rate is controlled by the content management apparatus 206. The content management apparatus is further configured to base the decision on current or predicted network resource demands. As discussed previously, this process may be in concert with provisioning suggestions from a smart CPE 106 in some embodiments, and in others the decision processes is entirely under the purview of the content management apparatus 206.

Further, in some embodiments the pre-caching of HpoV content is presented to the user as a premium or enhanced service. Locally stored (as a result of a previous trickle download, etc.) HpoV content may be highlighted in order to inform the user that the particular content is already prepared for viewership. Furthermore, this technique may showcase the HpoV identification engine for the user (e.g. the user may appreciate the suggestions of the HpoV identification engine). Additionally, the locally stored content may be available during time of high network usage or other times when the content would not normally be available to a given user (depending on the user's service level or current network connectivity). Thus, the system may increase user experience by presenting a user with a library of HpoV content (i.e. content the user is likely to want to consume) with constant or near constant availability.

Alternatively, in other embodiments the pre-caching of HpoV is presented simply as an opt-in embodiment, allowing the MSO (or other content management entity) to collect information related to the user with the intent of identifying HpoV content. The HpoV content identification system is presented in a form transparent to the user (i.e. the user is notified of HpoV content being pre-caching). However, in other opt-in embodiments that HpoV content identification system may be opaque, and the user is only aware of increases in performance associated with HpoV content pre-caching. Thereby, in the opaque embodiments no extra user interface functions would be added.

It can also be appreciated that, in such opt-in embodiments, the information may also be used in the identification of secondary content of interest to the user. In some embodiments the addition of secondary content of interest to the user could be used to generate revenue from advertisers. Methods and apparatus for the identification and insertion of such secondary content as discussed in co-owned U.S. patent application Ser. No. 12/503,710 filed Jul. 15, 2009 and entitled "METHODS AND APPARATUS FOR TARGETED SECONDARY CONTENT INSERTION", issued as U.S. Pat. No. 8,813,124 on Aug. 19, 2014, incorporated herein by reference.

In addition, some embodiments may weight the likelihood of viewership for HpoV content. In these embodiments, methods would further comprise steps to gauge a percentage or confidence interval associated with the likelihood a user at a given CPE will view particular content. Then a portion of the content can be transmitted to the CPE, wherein the size of the portion of the content is based on the likelihood that the user views the content. Then, if the user actually views the content, the remaining portion will be transmitted. For example, if the chance a user associate with a given CPE will view particular content is 50%, only 40% of the content may be transmitted to the CPE in advance of viewing. In another instance, that likelihood may be 80% and a larger portion would be transmitted in advance.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A non-transitory computer-readable apparatus comprising a storage medium having at least one computer program stored thereon, the at least one computer program comprising a plurality of instructions configured to, when executed by a digital processor apparatus, cause a networked apparatus to:
based at least on a determination that at least a partial match exists between (i) data associated with digitally rendered content and (ii) data related to a user associated with a content delivery network, generate prediction data relating to a likelihood of interest by the user for the digitally rendered content;
based at least on the prediction data, identify the digitally rendered content as high probability of viewership (HpoV) content; and
cause transmission, during an expected period of low network demand, of at least a portion of the HpoV content to one or more computerized client devices associated with at least the user;
wherein the transmission to the one or more computerized client devices comprises a transmission of the at least portion of the HpoV content at a data transfer rate that is less than that associated with a real-time presentation of the at least portion of the HpoV content outside of the expected period of low network demand.

2. The non-transitory computer-readable apparatus of claim 1, wherein the plurality of instructions are further configured to, when executed by the digital processor apparatus, cause the networked apparatus to:
based at least on a comparison between (i) the data associated with the digitally rendered content and (ii) data relating to one or more viewership criteria, determine whether at least a partial match exists between the digitally rendered content and a user request; and
responsive to a determination that the digitally rendered content matches the user request, identify the digitally rendered content as the HpoV content.

3. The non-transitory computer-readable apparatus of claim 1, wherein the plurality of instructions are further configured to, when executed by the digital processor apparatus, cause the networked apparatus to:
based at least on a comparison between (i) the data associated with the digitally rendered content and (ii) data associated with user history, determine whether at least a partial match exists between the digitally rendered content and the user history; and
responsive to a determination that the at least partial match exists between the digitally rendered content and the user history, generate data identifying the digitally rendered content as the HpoV content.

4. The non-transitory computer-readable apparatus of claim 3, wherein the comparison between (i) the data associated with the digitally rendered content and (ii) the data associated with the user history is responsive to a determination that the digitally rendered content does not meet a prescribed level of matching a user request.

5. The non-transitory computer-readable apparatus of claim 1, wherein the plurality of instructions are further configured to, when executed by the digital processor apparatus, cause the networked apparatus to:
based at least on a comparison between (i) the data associated with the digitally rendered content and (ii) demographic data of a user associated with the networked apparatus, determine whether at least a partial match exists between the digitally rendered content and demographic data; and responsive to a determination that the at least partial match exists between the digitally rendered content and the demographic data of the user, identify the digitally rendered content as HpoV content.

6. The non-transitory computer-readable apparatus of claim 5, wherein the comparison between (i) the data associated with the digitally rendered content and (ii) the demographic data of the user associated with the networked apparatus is responsive to a determination that an aspect of the digitally rendered content does not match a related aspect of a user history.

7. The non-transitory computer-readable apparatus of claim 1, wherein the identification of the HpoV content is further based on recommendation data generated by the networked apparatus, the generation of the recommendation data comprising a determination of an amount of similarity between the digitally rendered content and the data related to the user;
   wherein the caused transmission of the at least portion of the HpoV content to the one or more computerized client devices associated with at least the user is based on the determined amount of similarity meeting or exceeding a predetermined value.

8. The non-transitory computer-readable apparatus of claim 1, wherein a size of the transmitted at least portion of the HpoV content is based at least on data relating to a likelihood of interest.

9. A computer-implemented method of operating a content delivery network, the computer-implemented method comprising:
   based at least in part on evaluation of data representative of a profile associated with a user, selecting, from a plurality of digitally rendered content elements, at least one predicted digitally rendered content element which the user is likely to be interested in consuming; and
   scheduling a transmission of the selected at least one digitally rendered content element to one or more client devices associated with the user during a period when network demand is expected to be below a prescribed value, the scheduled transmission of the predicted at least one digitally rendered content element comprising a transmission at a data rate less than that associated with a real-time presentation of digitally rendered content.

10. The computer-implemented method of claim 9, wherein the selecting from the plurality of digitally rendered content elements comprises identifying over-the-top (OTT) content originated or sourced from a third-party content source.

11. The computer-implemented method of claim 9, wherein the selecting of the at least one digitally rendered content element from the plurality of digitally rendered content elements comprises:
   comparing (i) data associated with the plurality of digitally rendered content elements with (ii) one or more aspects of data representative of a user profile;
   evaluating whether a similarity between the data associated with the plurality of digitally rendered content and the one or more aspects of data representative of a user profile is above a prescribed threshold; and
   identifying the selected at least one digitally rendered content element based at least on the similarity being above the prescribed threshold.

12. The computer-implemented method of claim 9, wherein the scheduling of the transmission of the selected at least one digitally rendered content element during the expected period of low demand comprises detecting at least an occurrence of an event, the event comprising a network resource demand falling below a predetermined threshold.

13. The computer-implemented method of claim 9, wherein the transmission of the selected at least one digitally rendered content element comprises transmission in an incomplete form so as to enable at least one of: (i) frustration of user access of the transmitted selected at least one digitally rendered content element and/or (ii) reduced quality previewing of the transmitted selected at least one digitally rendered content element.

14. The computer-implemented method of claim 9, wherein the selecting, from the plurality of digitally rendered content elements, at least one digitally rendered content element which the user is likely to be interested in consuming, comprises utilizing an algorithmic analysis of at least one of (i) a time of day and/or (ii) data representative of another user profile to predict an interest in consuming by the user.

15. A network apparatus operable within a digital content delivery network, the apparatus comprising:
   a network interface configured to communicate digital data via the digital content delivery network;
   a storage apparatus comprising at least one computer program, the at least one computer program comprising a plurality of computer-readable instructions; and
   a digital processor apparatus in data communication with the storage apparatus and configured to execute the plurality of computer-readable instructions, the plurality of computer-readable instructions being configured to cause the apparatus to, when executed, cause the network apparatus to:
   (i) identify digital content, and (ii) access data related to the identified digital content;
   evaluate the data related to the identified digital content with respect to one or more criteria to determine whether at least a partial match exists between the identified digital content and behavioral data associated with a user of the digital content delivery network; and
   based at least on a determination that at least the partial match exists between the identified digital content and the behavioral data, schedule transmission of the identified digital content via the network interface to one or more client devices associated with the user during a period where network demand is expected or predicted to fall below a prescribed threshold;
   wherein the scheduled transmission correlates to a lower transmission rate than that correlated to a real-time presentation of the digital content.

16. The network apparatus of claim 15, wherein the plurality of computer-readable instructions are further configured to cause the network apparatus to, when executed, modify the lower transmission rate based at least on receipt of additional behavior data associated with the user.

17. The network apparatus of claim 15, wherein the plurality of computer-readable instructions are further configured to cause the network apparatus to, when executed, prevent the user from initiating consumption of the identified digital content until at least a threshold portion of the identified digital content is received at the one or more client devices.

18. The network apparatus of claim 15, wherein the plurality of computer-readable instructions are further configured to cause the network apparatus to, when executed:
   based at least on the determination that at least the partial match exists between the identified digital content and the behavioral data, designate the identified digital content as high probability of viewership (HpoV) content, the HpoV content being associated with a likelihood of viewership by the user, the scheduled transmission of the identified digital content comprising scheduled transmission of the HpoV content; and cause presentation of the transmitted identified digital content at least during a period of network demand which exceeds a prescribed threshold value.

19. The network apparatus of claim 18, wherein the designation of the HpoV content further comprises a determination that at least a partial match exists between the digital content and demographic data associated with the user.

20. The network apparatus of claim 15, wherein the plurality of computer-readable instructions are further configured to cause the network apparatus to, when executed:

compare data associated with a plurality of digital content with data representative of a plurality of user profiles;

determine a similarity between the data associated with the plurality of digital content and the data representative of the plurality of user profiles; and generate recommended content based at least on the determined similarity, the recommended content comprising the identified digital content;

wherein the scheduled transmission of the identified digital content comprises transmission of at least a portion of the generated recommended content.

21. The network apparatus of claim 15, wherein the scheduled transmission of the identified digital content comprises transmission in a substantially incomplete form so as to enable at least one of: (i) frustration of user decode or rendering of the identified digital content and/or (ii) reduced-quality previewing of the identified digital content.

\* \* \* \* \*